US012746700B2

(12) United States Patent
Laschinski et al.

(10) Patent No.: US 12,746,700 B2
(45) Date of Patent: Sep. 29, 2026

(54) KIT OF PERSONAL CARE APPLIANCE AND POWER PLUG

(71) Applicant: Braun GmbH, Kronberg (DE)

(72) Inventors: Gerd Laschinski, Bad Homburg (DE); Bernhard Sikora, Kelkheim (DE); Ruediger Boss, Frankfurt am Main (DE); Detlef Gleich, Friedrichsdorf (DE)

(73) Assignee: Braun GMBH, Kronberg (DE)

( * ) Notice: Subject to any disclaimer, the term of this patent is extended or adjusted under 35 U.S.C. 154(b) by 541 days.

(21) Appl. No.: 18/215,251

(22) Filed: Jun. 28, 2023

(65) Prior Publication Data

US 2024/0016277 A1 Jan. 18, 2024

(30) Foreign Application Priority Data

Jun. 29, 2022 (EP) .................................... 22181990

(51) Int. Cl.
*B26B 19/38* (2006.01)
*H01R 13/64* (2006.01)

(52) U.S. Cl.
CPC ......... *B26B 19/3873* (2013.01); *H01R 13/64* (2013.01); *A45D 2200/25* (2013.01)

(58) Field of Classification Search
CPC ..... B26B 19/2873; B26B 19/00; H01R 13/64; H01R 13/5219; H01R 13/5202; H01R 13/52; H01R 13/6456; A45D 2200/25
(Continued)

(56) References Cited

U.S. PATENT DOCUMENTS 1,157,026 A 10/1915 Meschenmoser
3,611,261 A 10/1971 Gregory
(Continued)

FOREIGN PATENT DOCUMENTS

CN 108899673 A 11/2018
DE 859647 C 12/1952
(Continued)

OTHER PUBLICATIONS

All Office Actions; U.S. Appl. No. 18/215,245, filed Jun. 28, 2023.
(Continued)

*Primary Examiner* — Tulsidas C Patel
*Assistant Examiner* — Carlos E Lopez-Pagan
(74) *Attorney, Agent, or Firm* — Gerd Zetterer

(57) ABSTRACT

A kit comprises a personal care appliance and a power supply device. The personal care appliance and power supply device may have mating connectors. The personal care appliance has a socket with a socket geometry assigned to an ingress protection class. The power supply device has a plug geometry also assigned to an ingress protection class. The socket is shaped to allow insertion of the power plug when the plug geometry is assigned to an ingress protection class that is equal to the first ingress protection class, to allow insertion of the power plug when the plug geometry is assigned to an ingress protection class that is higher than the first ingress protection class, and to prevent insertion of the power plug when the plug geometry is assigned to an ingress protection class that is lower than the first ingress protection class.

20 Claims, 13 Drawing Sheets

(58) Field of Classification Search
USPC .......................................................... 439/680
See application file for complete search history.

(56) References Cited

U.S. PATENT DOCUMENTS

| | | | |
|---|---|---|---|
| 3,813,638 A | 5/1974 | Kinnear | |
| 4,403,824 A | 9/1983 | Scott | |
| 4,449,776 A | 5/1984 | Carmo et al. | |
| 4,632,121 A | 12/1986 | Johnson et al. | |
| 5,634,829 A | 6/1997 | Kerul | |
| 6,049,192 A | 4/2000 | Kfoury et al. | |
| 6,244,882 B1 | 6/2001 | Greenstein | |
| 6,921,281 B2 * | 7/2005 | Chen .................. | H01R 13/5825 439/906 |
| 7,121,899 B2 * | 10/2006 | Homann ................ | H01R 24/66 439/680 |
| 8,152,570 B2 | 4/2012 | Kim et al. | |
| 9,490,599 B2 | 11/2016 | Griffith et al. | |
| 2005/0197018 A1 * | 9/2005 | Lord ...................... | H01R 27/02 439/680 |
| 2010/0186234 A1 | 7/2010 | Binder | |
| 2011/0018498 A1 | 1/2011 | Soar | |
| 2012/0113645 A1 | 5/2012 | Liao et al. | |
| 2012/0171657 A1 * | 7/2012 | Ortins .................. | A61C 17/221 434/365 |
| 2013/0201316 A1 | 8/2013 | Binder et al. | |
| 2015/0249359 A1 | 9/2015 | Gunderson | |
| 2015/0380909 A1 | 12/2015 | Chen et al. | |
| 2016/0329614 A1 | 11/2016 | Madan et al. | |
| 2018/0207821 A1 * | 7/2018 | Schaefer ............. | B26B 19/3873 |
| 2019/0199031 A1 | 6/2019 | Surana | |
| 2019/0242562 A1 | 8/2019 | Chien | |
| 2021/0345515 A1 | 11/2021 | Thiel et al. | |
| 2022/0324126 A1 * | 10/2022 | Loeper ................ | B26B 19/3873 |
| 2025/0153380 A1 | 5/2025 | Loeper et al. | |

FOREIGN PATENT DOCUMENTS

| | | | |
|---|---|---|---|
| EP | 1995827 | A2 | 11/2008 |
| EP | 3584889 | A1 | 12/2019 |
| WO | 2011015915 | A1 | 2/2011 |
| WO | 2011156768 | A2 | 12/2011 |
| WO | 2022094657 | A1 | 5/2022 |

OTHER PUBLICATIONS

Extended EP Search Report and Opinion for 22181990.7 dated Dec. 1, 2022, 11 pages.

Extended EP Search Report and Opinion for 23182139.8 dated Sep. 1, 2023, 11 pages.

All Office Actions; U.S. Appl. No. 18/212,781, filed Jun. 22, 2023.

All Office Actions; U.S. Appl. No. 18/212,794, filed Jun. 22, 2023.

Anonymous et al: "Philips HC7450/80 User Manual (p. 8 of 118) ManualsLib",XP055982810, URL : https ://www . manualslib. com/manual/1106685/Philips-Hc7450-80 . html?page=8#manual, dated Dec. 22, 2015, 3pgs.

PCT Search Report and Written Opinion for PCT/I B2023/056678 dated Sep. 1, 2023,15 pages.

Unpublished U.S. Appl. No. 18/212,781, filed Jun. 22, 2023, to Jan Christian Langsdorf et. al.

Unpublished U.S. Appl. No. 18/212,794, filed Jun. 22, 2023 to Jan Christian Langsdorf et. al.

Unpublished U.S. Appl. No. 18/215,245, filed Jun. 28, 2023, to Gerd Laschinski et. al.

* cited by examiner

| | 300  | 150  | 280  |
|---|---|---|---|
| 290  | fits | fits | fits |
| 50  | - | fits | fits |
| 270  | - | - | fits |

KIT OF PERSONAL CARE APPLIANCE AND POWER PLUG

FIELD OF THE INVENTION

The invention relates to a kit of a personal care appliances, power plugs for personal care appliances. The invention relates in particular to male and female connectors for use in personal care appliances and power plugs.

BACKGROUND OF THE INVENTION

Personal care appliances are widely used. Examples for such appliances include hair removal, cutting, or trimming devices (such as shavers, body groomers, epilation devices, etc.) or oral care devices (such as toothbrushes, tongue cleaning devices, or dental shower devices).

Various personal care appliances are designed for use in wet conditions, such as for use under a shower or in a bathtub. Such personal care appliances may be designed for use in moist conditions. The ability of a personal care appliance to withstand water ingress may be classified by an ingress protection, IP, class.

When personal care appliances are designed to withstand water ingress, there may still be challenges associated with the electrical connectors of such personal care appliances and the associated power supply devices. For illustration, remnant moisture may cause electrolysis of electrical contacts, reducing appliance life. For further illustration, it may be of particular relevance to ensure that power supply devices that are connected

SUMMARY OF THE INVENTION

A kit comprises a first personal care appliance, wherein the first personal care appliance is one of an electric toothbrush, a shaver, a charging device, a cleaning station or an epilator, comprising a first housing having a first socket, optionally having exactly two connector sleeves; wherein the first socket having a first socket geometry selected from a set of two or more different socket geometries that are each assigned to a different one of several ingress protection, IP, classes, the first socket geometry being assigned to a first IP class. The kit comprises a power supply device comprising a power plug, optionally having exactly two connector pins, wherein the power plug having a plug geometry selected from a set of two or more different plug geometries that are each assigned to a different one of the two or more IP classes. The first socket is shaped to allow insertion of the power plug when the plug geometry is assigned to an IP class that is equal to the first IP class, allow insertion of the power plug when the plug geometry is assigned to an IP class that is higher than the first IP class, and prevent insertion of the power plug when the plug geometry is assigned to an IP class that is lower than the first IP class.

A kit comprises a power supply device comprising a power plug, the power plug having a first plug geometry selected from a set of two or more different plug geometries that are each assigned to a different one of two or more IP classes. The kit comprises a personal care appliance comprising a socket having a socket geometry selected from a set of two or more different plug geometries that are each assigned to a different one of the two or more IP classes. The power plug is shaped to allow insertion into the socket when the first IP class is equal to an IP class to which the socket geometry is assigned and when the first IP class is greater than the IP class to which the socket geometry is assigned.

The power plug is shaped to prevent insertion into the socket when the first IP class is smaller than the IP class to which the socket geometry is assigned.

Advantageously, the kit comprises a first personal care appliance comprising a first housing having a first socket, the first socket having a first socket geometry, a second personal care appliance comprising a second housing having a second socket, the second socket having a second socket geometry, said second housing being provided more watertight than said first housing, a first power supply device comprising a first power housing and a first power plug, the first power plug having a first plug geometry, a second power supply device comprising a second power housing and a second power plug the second power plug having a second plug geometry, said second power housing being provided more watertight than said first power housing, wherein said first plug geometry is provided to fit within said first socket but not within said second socket and wherein said second plug geometry is provided to fit within both said first and said second socket. This assures that the user can electrically connect only those personal care appliances which are provided with the same degree of watertightness or a higher standard of that by the plug of the power supply device.

Furthermore, said first plug geometry has a first connecting surface provided for connecting with said first socket is larger than a second connecting surface of said second plug geometry provided for connecting with said second socket. Those connecting surfaces are covered by the sockets when the respective fitting plug is inserted therein.

Moreover, said first plug geometry is provided with a first lateral notch and wherein said second plug geometry is provided with a second lateral notch and wherein the second lateral notch is deeper than the first lateral notch. Thus, the outer geometry of the different plug types differs with respect to the deepness of a lateral notch. A deeper notch also increases the connecting surface of said plug. Further advantageously the set includes at least a third appliance e and power device. This kit comprises: a third personal care appliance comprising a third housing having a third socket, the third socket having a third socket geometry, said second housing and first housing being provided more watertight than said third housing, a third power supply device comprising a third power housing and a third power plug, the third power plug having a third plug geometry, said second power housing and said first power housing being provided more watertight than said first power housing, wherein said first and said second plug geometry is provided to fit within said third socket and wherein said third plug geometry is provided to fit within neither said first nor said second socket.

Said first and second power supply devices are of the switch mode power supply type converting the mains voltage into a lower appliance voltage and/or wherein the first and second personal care appliance is one of an electric toothbrush, a shaver, a charging device, a cleaning station or an epilator.

As per the above, the different plug and socket geometries serve to assure appropriate fitting structure with respect to the IP class or watertightness of the devices electrically to be connected. Alternatively, the different plug and socket geometries and fitting structures described hereinabove and below may serve to assure a different compatibility purposes, such as appropriate electrical parameters (Voltage, Current) of the power supply for the appliance or other.

BRIEF DESCRIPTION OF THE DRAWINGS

Embodiments will be described with reference to the drawings in which identical or corresponding reference signs designate identical or corresponding elements.

DETAILED DESCRIPTION OF THE INVENTION

Figure 1:
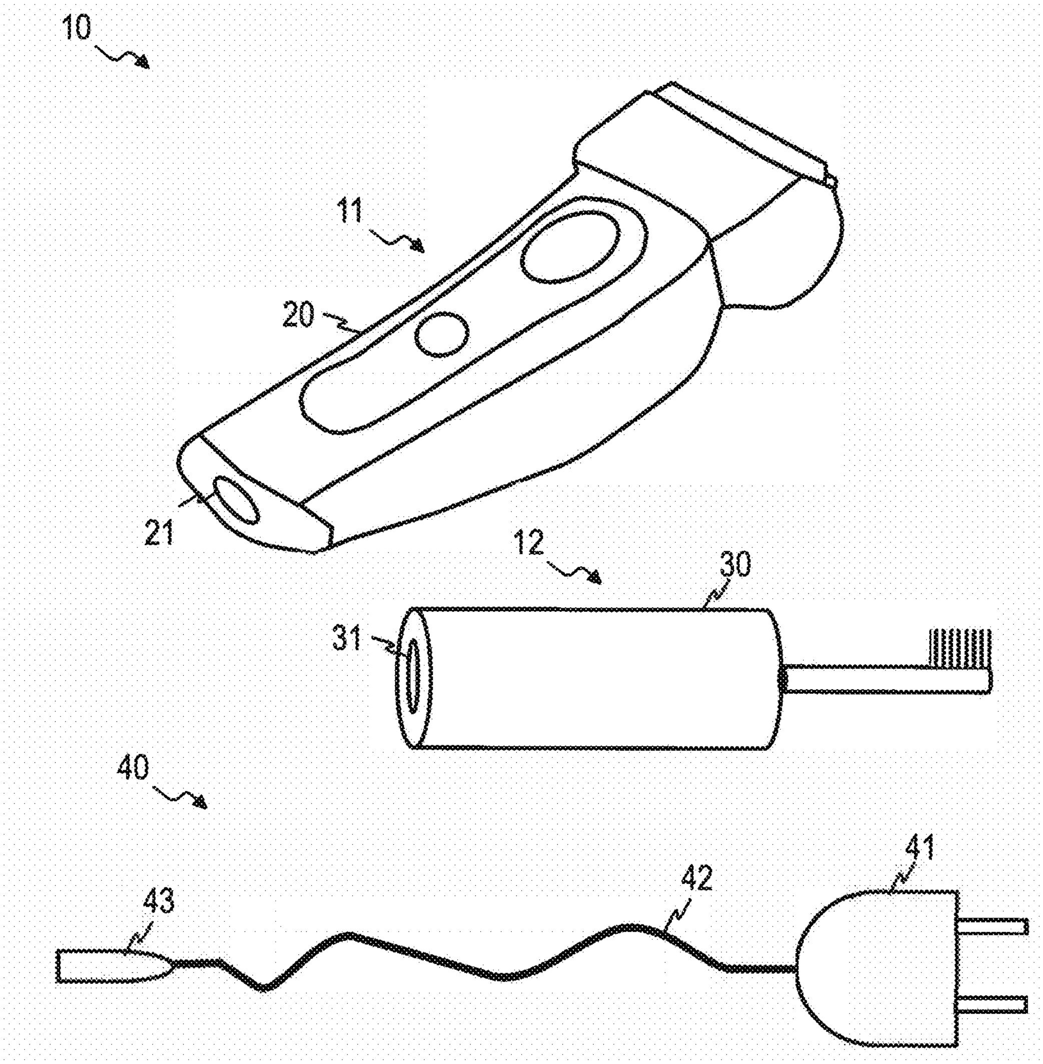
FIG. 1 shows a system comprising a personal care appliance and a power supply device.

Embodiments will be described with reference to the drawings. Features of embodiments may be combined with each other unless explicitly stated otherwise.

While embodiments will be described in association with power supply devices for hair removal or cutting appliances or oral care appliances, and in association with systems, kits, and methods that may involve such personal care appliances, the techniques are not limited thereto. For illustration, the socket and plug geometries disclosed herein may be used in association with power supply to other appliances, in particular other home appliances. The male and female connectors may be used for supplying a home appliance with power which may but does not need to be a personal care appliance. Kitchen appliances or smart mobile devices are examples for such appliances.

While embodiments will be described in which a female connector is provided on an appliance and a male connector is provided on a power supply device, the invention is not limited thereto. In other embodiments, the male connector may be provided on the appliance and the female connector may be provided on the power supply device.

Embodiments of the invention relate to features used for supplying power to appliances that are suitable for mitigating problems associated with remnant moisture.

Techniques are provided that mitigate adverse effects of electrical creep currents and/or that allow inadvertent use of an appliance with a power supply device that does not have the required ingress protection (IP) class.

As used herein, the phrases "power supply" or "supplying with power" encompasses the provision of electric energy to an appliance for live use of the appliance (e.g., for using the supplied power for driving an electromechanical actuator) and the provision of electric energy to an appliance for charging a battery that may optionally be present.

An appliance comprises a housing having a socket for insertion of a plug, a first connector pin, and a second connector pin. At least a part of the first connector pin and at least a part of the second connector pin extends within the socket. The first connector pin has a first center axis. The second connector pin has a second center axis. The first center axis and the second center axis are spaced by a pin distance. The first center axis and the second center axis define a first plane. A second plane is perpendicular to the first plane and extends parallel to and is equally spaced from the first center axis and the second center axis. The socket is provided with a socket circumferential wall and a socket bottom wall. The socket circumferential wall comprises a first circumferential wall segment, a second circumferential wall segment, a third circumferential wall segment that is curved, intersects the first plane, and interconnects the first wall segment and the second wall segment, and a fourth circumferential wall segment that is curved, intersects the first plane, and interconnects the first wall segment and the second wall segment. The first and second circumferential wall segments are arranged on opposite sides of the first plane. The third and fourth circumferential wall segments are arranged on opposite sides of the second plane. The second circumferential wall segment comprises a projection segment that forms a projection. The socket bottom wall comprises a first bottom wall segment extending transverse to the first and second planes, wherein the first connector pin projects from the first bottom wall segment, a second bottom wall segment extending transverse to the first and second planes, wherein the second connector pin projects from the second bottom wall segment. A third plane is perpendicular to the first plane and the second plane. The first bottom wall segment and the second bottom wall segment may extend in the third plane. The third circumferential wall segment may have a radius of curvature. More particularly an intersection of the third circumferential wall segment with the third plane has a curvature line which has a radius of curvature. A ratio of the radius of curvature to the pin distance is at most 0.35. The radius of curvature of the third circumferential wall segment may be the radius of curvature measured on that part of the third circumferential wall segment that is closest to (e.g., located within) the third plane.

In the appliance, the radius of curvature of the third circumferential wall segment (which may be identical to the radius of curvature of the fourth circumferential wall segment) is a quantitative indicator of the socket height, measured perpendicular to the first plane. By maintaining the ratio of the radius of curvature to the pin distance to be at most 0.35, the risk of electrical creepage can be reduced. Electrical creep resistance is made large by spacing the connector pins by a pin distance that is sufficiently large, compared to the radius of curvature, that the ratio of the radius of curvature to the pin distance is at most 0.35. This rather large pin distance—for reducing the electrical creepage risk—combined with a rather small radius of curvature of the fourth (and preferably also third) circumferential wall allows a still very compact plug and socket design despite this pin distance. Thus, the plug and sockets result in being rather wide in the direction of pin distance but also narrow in direction orthogonal to that.

The appliance may be a personal care appliance or other household appliance. Providing enhanced resistance against adverse effects of remnant moisture is of particular relevance for such devices.

The appliance may be a personal care appliance that is a hair removal, cutting, or trimming device (such as shavers, body groomers, epilation devices, etc.). Providing enhanced resistance against adverse effects of remnant moisture is of particular relevance for such devices.

The appliance may be a personal care appliance that is an oral care device (such as toothbrushes, tongue cleaning devices, or dental shower devices). Providing enhanced resistance against adverse effects of remnant moisture is of particular relevance for such devices.

The third circumferential wall segment may comprise a first circular arc around the first center axis extending over a first angle of at least 170°. Alternatively, or additionally, the fourth circumferential wall segment may comprise a second circular arc around the second center axis extending over a second angle of at least 170°.

The third circumferential wall segment may be shaped as a frustoconical arc or a cylinder segment (as respectively seen from the inside), extending over an angle of at least 170° around the first center axis.

The fourth circumferential wall segment may be shaped as a frustoconical arc or a cylinder segment (as respectively seen from the inside), extending over an angle of at least 170° around the second center axis.

The socket may have a socket width, measured along the first plane (e.g., as distance between points located on the third and fourth circumferential wall segments and on the first plane). A ratio of the pin distance to the socket width may be at least 0.60, at least 0.61, or at least 0.62. In a socket having such a configuration, the pins are spaced far apart as compared to conventional connector configurations, which further decreases the risk of creep currents.

The first and third planes may intersect the socket circumferential wall at a first point of intersection. The first and third planes may further intersect the socket circumferential wall at a second point of intersection. A socket width may be a distance between the first point of intersection and the second point of intersection, and a ratio of the pin distance to the socket width may be at least 0.60, at least 0.61, or at least 0.62. In a socket having such a configuration, the pins are spaced far apart as compared to conventional connector configurations, which further decreases the risk of creep currents.

The socket may have a socket height, measured along a plane that is parallel to the second plane and passes through the first center axis (e.g., as distance between points located on the first and second circumferential wall segments and on the plane that is parallel to the second plane and passes through the first center axis). A ratio of the socket height to the socket width may be at most 0.60, at most 0.55, at most 0.50, at most 0.45, or at most 0.40. Alternatively, or additionally, a ratio of the socket height to the pin distance may be at most at most 0.75, at most 0.70, at most 0.65, at most 0.60, at most 0.55, at most 0.50, at most or at most 0.40. When the socket has such a configuration, the socket height is comparatively small compared to conventional female connectors. This further decreases the risk of creep current and allows a screw or bolt head to be positioned separately from and adjacent to the socket.

Each of the third and fourth circumferential wall segments may have the radius of curvature. More particularly an intersection of the third and fourth circumferential wall segment with the third plane has a curvature line which has a radius of curvature. One or several of the following may apply: a ratio of the radius of curvature to the socket width may be at most 0.20; a ratio of the radius of curvature to the pin distance may be at most 0.35 or at most 0.33. When the socket has such a configuration, a socket height (which is about twice the radius of curvature of the third and fourth circumferential wall segments) is comparatively small compared to conventional female connectors. This further decreases the risk of creep current and allows a screw or bolt head to be positioned separately from and adjacent to the socket.

The socket bottom wall may comprise a rib extending between the first bottom wall segment and the second bottom wall segment and projecting relative to the first bottom wall segment and the second bottom wall segment to separate the first bottom wall segment and the second bottom wall segment.

In the appliance, the rib of the bottom wall reduces electrical creep currents through moisture that may be left in the socket. The creep distance is increased, resulting in increased electrical resistance and reduced current flow. The projection is operative to prevent reverse polarity insertion of a plug of a power supply device. The projection also mitigates the risk of the appliance being used in association with a power supply device having an ingress protection (IP) class (IPC) that is not in conformity with that of the appliance and/or with a power supply device that is otherwise not intended to be used on or with the appliance.

The rib may extend continuously from the first circumferential wall segment to the second circumferential wall segment. Electric creepage is further reduced thereby.

The rib may have an apex line that lies within the second plane. Electric creepage is further reduced by a rib in which an apex (i.e., a position at which the peak of the rib projects from the first and second bottom segments by a greatest distance) is midway between the first and second pins.

The first circumferential wall segment may have a shape different from a shape of the second circumferential wall segment. Protection against insertion of a plug with reverse polarity is attained thereby.

The first circumferential wall segment may be planar. This affords ease of manufacture and ease of insertion of the plug.

The second circumferential wall segment may be provided with the projection.

The projection may have a projection width, measured along a width direction of the socket (e.g., in the third plane). A ratio of the projection width to the socket width may be at least 0.60 or at least 0.61. When the socket has such a configuration, the projection width is comparatively large compared to conventional female connectors. This further decreases the risk of electric creep current by increasing the distance at which creep current has to pass by a constriction and allows a screw or bolt head to be positioned separately from and adjacent to the socket.

The second center axis may be offset from the first center axis along a width direction of the socket. The projection segment may have a projection width, measured along the width direction. The projection width may be determined as a distance along the width direction between first and second projection segment ends at which the second circumferential wall segment starts curving inward relative to a plane interconnecting ends of the third and fourth circumferential wall segments. In case of a varying projection width the term projection width shall refer to the widest width measurable. (For illustration, the projection width may be obtained by: determining a curve of intersection of the second circumferential wall segment and the third plane, determining ends of the projection segment as outermost points of a segment on this curve of intersection at which the curve of intersection is spaced from the first plane by a distance less than a maximum distance as determined by the ends of the third and fourth circumferential wall segments, and determining the projection width as distance between these outermost points that defines the projection width). A ratio of the projection width to the socket width may be at least 0.60 or at least 0.61. When the socket has such a configuration, the projection width is comparatively large compared to conventional female connectors. This further decreases the risk of electric creep current by increasing the distance at which creep current has to pass by a constriction and allows a screw or bolt head to be positioned separately from and adjacent to the socket.

The personal care appliance may further comprise a screw head or bolt head that may be exposed on a surface of the housing. The housing may comprise a recess in which the screw or bolt head may be arranged.

The recess may be separated from the socket. The configuration of the socket allows the recess for the screw or bolt head to be positioned outside the socket. This further reduces electric creep currents, because there can be no creep current between the first and second connector pins via the screw or bolt head as there is a separating wall between the screw and the socket.

The housing may comprise a separation wall arranged between the socket and the recess in which the screw or bolt head is arranged.

The separation wall may have an outer end that defines a peripheral rim of the socket.

An interconnection plane may interconnect ends of the third and fourth circumferential wall segments that connect to the second circumferential wall segment. The interconnection plane may intersect the recess. This configuration allows the recess in which the screw or bolt head is arranged to protrude into the area in which the projection projects towards the first circumferential wall segment of the socket. This configuration allows the screw or bolt head to be placed outside the socket, by making available sufficient area for a screw or bolt adjacent the socket, which also reduces electric creep currents because there can be no creep current between the first and second connector pins via the screw or bolt head.

The fourth circumferential wall segment may have a radius of curvature equal to the radius of curvature of the third circumferential wall segment.

The ratio of the radius of curvature to the pin distance may be at most 0.35 or at most 0.33.

The appliance may further comprise electric power components connected to the first and second connector pins.

The electric power components may be designed to operate when a power supply voltage between the first and second connector pins is low voltage in a range from 2 to 18 V, or from 4 to 12 V, or of 5V. Compatibility of the appliance with voltages provided by, e.g., USB-type charging devices is facilitated thereby, providing a platform of appliance connectors that lends itself to integration with charging devices that operate at low voltage level (such as from 2 to 18 V, from 4 to 12 V, or 5V).

The electric power components may comprise a battery.

The electric power components may comprise an electromechanical actuator.

The projection of the appliance may have a projection geometry that is selected from a set of projection geometries, each of which is associated with a different IP class.

The projection geometry of the socket may allow plugs having a plug notch geometry to be inserted into the socket, provided that the plug notch geometry is assigned to an IP class that is equal to the IP class of the appliance. The projection geometry of the socket may additionally allow plugs having a plug notch geometry to be inserted into the socket, provided that the plug notch geometry is assigned to an IP class that is greater that the IP class of the appliance.

The first connector pin may have a diameter, measured perpendicular to the first central axis, which varies along the first center axis to enable the first connector pin to snap into a connector sleeve of a male connector.

An appliance according to a further embodiment comprises a housing having a socket for insertion of a plug, a first connector pin, and a second connector pin. At least a part of the first connector pin and at least a part of the second connector pin extends within the socket. The first connector pin has a first center axis. The second connector pin has a second center axis. The first center axis and the second center axis are spaced by a pin distance. The first center axis and the second center axis define a first plane. A second plane is perpendicular to the first plane and extends parallel to and is equally spaced from the first center axis and the second center axis. The socket is provided with a socket circumferential wall and a socket bottom wall. The socket circumferential wall comprises a first circumferential wall segment, a second circumferential wall segment, a third circumferential wall segment that is curved, intersects the first plane, and interconnects the first wall segment and the second wall segment, and a fourth circumferential wall segment that is curved, intersects the first plane, and interconnects the first wall segment and the second wall segment. The first and second circumferential wall segments are arranged on opposite sides of the first plane. The third and fourth circumferential wall segments are arranged on opposite sides of the second plane. The second circumferential wall segment comprises a projection segment that forms a projection.

The socket may have a socket width, measured along the first plane (e.g., as distance between points located on the third and fourth circumferential wall segments and on the first plane). A ratio of the pin distance to the socket width may be at least 0.60, at least 0.61, or at least 0.62. The spacing of the pins decreases the risk of creep currents.

A third plane may be perpendicular to the first and second planes. The third plane may contain therein at least part of the bottom wall or may be parallel to the bottom wall.

The first and third planes may intersect the socket circumferential wall at a first point of intersection. The first and third planes may further intersect the socket circumferential wall at a second point of intersection. A socket width may be a distance between the first point of intersection and the second point of intersection, and wherein a ratio of the pin distance to the socket width may be at least 0.60, at least 0.61, or at least 0.62. The spacing of the pins decreases the risk of creep currents.

The appliance and, in particular, its female connector may have any one of the additional features described above.

The appliance may be a personal care appliance or other household appliance.

A power plug for an appliance comprises a first connector sleeve and a second connector sleeve. The first connector sleeve has a first sleeve center axis. The second connector sleeve has a second sleeve center axis. The first sleeve center axis and the second sleeve center axis are spaced by a sleeve distance. The first sleeve center axis and the second sleeve center axis define a first plane. A second plane is perpendicular to the first plane and extends parallel to and is equally spaced from the first sleeve center axis and the second sleeve center axis. The power plug further comprises an end surface in which a first pin insertion opening and a second pin insertion opening are arranged and an circumferential connector wall that extends from a circumference of the end surface. The circumferential connector wall comprises a first circumferential connector wall segment, a second circumferential connector wall segment, a third circumferential connector wall segment that is curved, intersects the first plane, and interconnects the first circumferential connector wall segment and the second circumferential connector wall segment, and a fourth circumferential connector wall segment that is curved, intersects the first plane, and interconnects the first circumferential connector wall segment and the second circumferential connector wall segment. The first and second circumferential connector wall segments are arranged on opposite sides of the first plane. The third and fourth circumferential connector wall segments are arranged on opposite sides of the second plane. The second circumferential connector wall segment comprises a connector notch segment that forms a connector notch. The end surface comprises a first end surface segment extending transverse to the first and second planes. The first connector sleeve projects from the first end surface portion. The end surface comprises a second end surface segment extending transverse to the first and second planes. A third plane is perpendicular to the first plane and the second plane. The first end surface segment and the second end surface segment may extend in the third plane. The third circumferential connector wall segment may have a radius of curvature. A ratio of the radius of curvature to the sleeve distance may be at most 0.35. The radius of curvature of the third circumferential connector wall segment may be the radius of curvature measured on that part of the third circumferential connector wall segment that is closest to (e.g., located within) the third plane.

A power plug having such a configuration provides a sleeve distance that is large compared to the connector height (measured transverse to the first plane). The sleeve distance that is large compared to the connector height reduces the risk of electric creep currents. The connector height that is small compared to the sleeve distance reduces the amount of liquid that can be introduced into a female connector during use, which in turn also mitigates the risk of electric creepage.

The notch is operative to prevent reverse polarity insertion into a socket of an appliance. The notch also mitigates the risk of the power plug being used in association with an appliance having an ingress protection (IP) class (IPC) that is not in conformity with that of a power supply device that comprises the power plug and/or with an appliance that is otherwise not intended to be used on or with the power supply device that comprises the power plug.

The end surface may comprise a groove arranged between the first end surface segment and the second end surface segment.

The groove may be operative to provide water drainage.

In the power plug, the groove may further assist in removal of remnant moisture.

The end surface may extend transverse to the first plane.

The first end surface segment may comprise a first annular area that is transverse, in particular perpendicular to the first plane.

The second end surface segment may comprise a second annular area that is transverse, in particular perpendicular to the first plane.

The groove may be recessed compared to a plane in which the first annular area and the second annular area extend.

The groove may comprise a first sloped portion extending from the first annular area and a second sloped portion extending from the second annular area, wherein the first and second sloped portions are recessed more strongly from the plane in which the first annular area and the second annular area extend with increasing distance from the first and second annular area, respectively.

The groove may be formed by a V-shaped or U-shaped recess in the end surface.

Such a configuration facilitates drainage of remnant liquid.

An intersection of the end surface with the first plane may define a concave shape, with the end surface being lower (i.e., further away from a plane defined by the first and second pin insertion openings) close to the second plane than further away from the second plane.

An intersection of the end surface with the second plane may define a convex shape, with the end surface being lower (i.e., further away from a plane defined by the first and second pin insertion openings) close to the first plane than further away from the first plane.

Such a configuration facilitates drainage of remnant liquid.

The power plug may be operative for engagement with a personal care appliance or other household appliance. Providing enhanced resistance against adverse effects of remnant moisture is of particular relevance for such devices.

The power plug may be operative for engagement with a personal care appliance that is a hair removal, cutting, or trimming device (such as shavers, body groomers, epilation devices, etc.). Providing enhanced resistance against adverse effects of remnant moisture is of particular relevance for such devices.

The power plug may be operative for engagement with a personal care appliance that is an oral care device (such as toothbrushes, tongue cleaning devices, or dental shower devices). Providing enhanced resistance against adverse effects of remnant moisture is of particular relevance for such devices.

The third circumferential connector wall segment may comprise a first circular arc around the first center axis extending over a first angle of at least 170°.

The fourth circumferential connector wall segment may comprise a second circular arc around the second center axis extending over a second angle of at least 170°.

The third circumferential connector wall segment may be shaped as a frustoconical arc or a cylinder segment, extending over an angle of at least 170° around the first center axis.

The fourth circumferential connector wall segment may be shaped as a frustoconical arc or a cylinder segment, extending over an angle of at least 170° around the second center axis.

The power plug may have a plug connector width, measured along the first plane (e.g., as distance between points located on the third and fourth circumferential connector wall segments and on the first plane). A ratio of the sleeve distance to the plug connector width may be at least 0.59, at least 0.60, at least 0.61, or at least 0.62. In a power plug having such a configuration, the sleeves are spaced far apart as compared to conventional connector configurations, which decreases the risk of creep currents during use of the power plug.

The first and third planes may intersect the circumferential connector wall at a first point of intersection and the first and third planes intersect the circumferential connector wall at a second point of intersection. A plug connector width may be a distance between the first and second points of intersection. A ratio of the sleeve distance to the plug connector width may be at least 0.50, at least 0.55, at least 0.60, or at least 0.62. In a power plug having such a configuration, the sleeves are spaced far apart as compared to conventional connector configurations, which decreases the risk of creep currents during use of the power plug.

The groove may extend continuously between the first circumferential connector wall segment and the second circumferential connector wall segment.

The groove may extend continuously from the first circumferential connector wall segment to the second circumferential connector wall segment.

The power plug may have a plug connector height, measured along a plane that is parallel to the second plane and passes through the first center axis (e.g., as distance between points located on the first and second circumferential connector wall segments and on the plane that is parallel to the second plane and passes through the first center axis). A ratio of the plug connector height to the plug connector width may be at most 0.60, at most 0.55, at most 0.50, at most 0.45, or at most 0.40. Alternatively, or additionally, a ratio of the plug connector height to the sleeve distance may be at most 0.60, at most 0.55, at most 0.50, at most 0.45, or at most 0.40. When the power plug has such a configuration, the plug connector height is comparatively small compared to conventional male connectors. This further reduces the risk of remnant liquid that could be introduced into a socket of an appliance during use.

An intersection of the third and fourth circumferential connector wall segments with the third plane may have a radius of curvature. More particularly an intersection of the third and fourth circumferential wall segment with the third plane has a curvature line has a radius of curvature. A ratio of the radius of curvature to the plug connector width may be at most 0.20. When the plug has such a configuration, a plug height (which is about twice the radius of curvature of the third and fourth circumferential connector wall segments) is comparatively small compared to conventional male connectors. This further reduces the risk of remnant liquid that could be introduced into a socket of an appliance during use.

The first circumferential connector wall segment may have a shape different from a shape of the second circumferential connector wall segment. Protection against insertion of the plug with reverse polarity is attained thereby.

The first circumferential connector wall segment may be planar. This affords ease of manufacture and ease of insertion of the plug.

The notch may have a notch width, measured along a width direction of the plug connector (e.g., in the third plane). One or several of the following may apply: a ratio of the notch width to the plug connector width may be at least 0.60 or at least 0.61; a ratio of the notch width to the sleeve distance may be at least 0.50, at least 0.55, at least 0.60, at least 0.65, at least 0.70, at least 0.75, at least 0.80, at least 0.85, at least 0.90, or at least 0.95. When the connector has such a configuration, the notch width is comparatively large compared to conventional male connectors. This further assists in reducing the risk of remnant moisture being introduced into an appliance socket.

The second center axis may be offset from the first center axis along a width direction of the power plug connector. The notch segment may have a notch width, measured along the width direction. The notch width may be determined as a distance along the width direction between first and second notch segment ends at which the second circumferential connector wall segment starts curving inward relative to a plane interconnecting ends of the third and fourth circumferential connector wall segments. (For illustration, the notch width may be obtained by: determining a curve of intersection of the second circumferential connector wall segment and the third plane, determining ends of the notch segment as outermost points of a segment on this curve of intersection at which the curve of intersection is spaced from the first plane by a distance less than a maximum distance as determined by the ends of the third and fourth circumferential connector wall segments, and determining the notch width as distance between these outermost points that defines the notch width). One or several of the following may apply: a ratio of the notch width to the plug connector width may be at least 0.60 or at least a ratio of the notch width to the sleeve distance may be at least 0.50, at least 0.55, at least at least 0.65, at least 0.70, at least 0.75, at least 0.80, at least 0.85, at least 0.90, or at least 0.95. When the socket has such a configuration, the notch width is comparatively large compared to conventional male connectors. This further decreases the risk of electric creep current by increasing the distance between pins that can engage with the connector sleeves. The notch height may be measured by: determining a line of intersection of the notch segment and the third plane; determining a maximum and minimum distance of this line of intersection from an intersection line at which the third plane intersects the first circumferential connector wall segment; and determining the notch height as difference between the maximum and minimum distances.

The power plug may be operative to supply power with a low voltage in a range from 2 to 18 V, or from 4 to 12 V, or of 5V. Compatibility of the power plug with voltages provided by, e.g., USB-type charging devices is facilitated thereby, providing a platform of appliance connectors that lends itself to integration with charging devices that operate at such voltage levels.

The fourth circumferential connector wall segment may have a radius of curvature equal to the radius of curvature of the third circumferential connector wall segment.

The ratio of the radius of curvature to the sleeve distance may be at most 0.35 or at most The notch of the power plug may have a notch geometry that is selected from a set of notch geometries, each of which is associated with a different IP class.

The notch geometry of the plug may allow the plug to be inserted into appliances having a socket projection geometry, provided that the socket projection geometry is assigned to an IP class that is equal to the IP class of the power plug. The notch geometry of the plug may allow the plug to be inserted into appliances having a socket projection geometry, provided that the socket projection geometry is assigned to an IP class that is less than the IP class of the power plug.

The power plug may comprise a first plastic component that comprises the circumferential connector wall and the end surface. The power plug may further comprise a second plastic component connected to an end of the first plastic component that may be opposite the end surface, the second plastic component being formed from a second plastic material, the first plastic material having a first hardness and the second plastic material having a second hardness different from the first hardness. This allows the components required for mitigating the risk of reverse polarity insertion of the power plug to be formed from a harder material while allowing the components that may need to bend and deflect during use to be formed from a softer material.

A power plug according to another embodiment comprises a first connector sleeve and a second connector sleeve. The first connector sleeve has a first sleeve center axis. The second connector sleeve has a second sleeve center axis. The first sleeve center axis and the second sleeve center axis are spaced by a sleeve distance. The first sleeve center axis and the second sleeve center axis define a first plane. A second plane is perpendicular to the first plane and extends parallel to and is equally spaced from the first sleeve center axis and the second sleeve center axis. The power plug further comprises an end surface in which a first pin insertion opening, and a second pin insertion opening are arranged and an circumferential connector wall that extends from a circumference of the end surface. The circumferential connector wall comprises a first circumferential connector wall segment, a second circumferential connector wall segment, a third circumferential connector wall segment that is curved, intersects the first plane, and interconnects the first circumferential connector wall segment and the second circumferential connector wall segment, and a fourth circumferential connector wall segment that is curved, intersects the first plane, and interconnects the first circumferential connector wall segment and the second circumferential connector wall segment. The first and second circumferential connector wall segments are arranged on opposite sides of the first plane. The third and fourth circumferential connector wall segments are arranged on opposite sides of the second plane. The second circumferential connector wall segment comprises a connector notch segment that forms a connector notch. The end surface comprises a first end surface segment extending transverse to the first and second planes. The first connector sleeve projects from the first end surface portion. The end surface comprises a second end surface segment extending transverse to the first and second planes.

The power plug may have a plug connector width, measured along the first plane (e.g., as distance between points located on the third and fourth circumferential connector wall segments and on the first plane). A ratio of the sleeve distance to the plug connector width may be at least 0.59, at least 0.60, at least 0.61, or at least 0.62. The spacing of the sleeves decreases the risk of creep currents during use of the power plug.

The first and third planes may intersect the circumferential connector wall at a first point of intersection and the first and third planes intersect the circumferential connector wall at a second point of intersection. A plug connector width may be a distance between the first and second points of intersection. A ratio of the sleeve distance to the plug connector width may be at least 0.59, at least 0.60, at least 0.61, or at least 0.62. The spacing of the sleeves decreases the risk of creep currents during use of the power plug.

The power plug and, in particular, its plug connector may have any one of the additional features described above.

The power plug may be a power plug for a personal care appliance or other household appliance.

The first connector sleeve may be a first slotted sleeve operative to snap over a first connector pin of a male connector.

The second connector sleeve may be a second slotted sleeve operative to snap over a second connector pin of a male connector.

A power supply device according to an embodiment comprises a power plug according to an embodiment. The power supply device is operative to reduce the risk of reverse polarity engagement of power plug and appliance. The power supply device is operative to mitigate the risk of electric creep currents.

The power supply device may comprise a converter. The power supply device may be operative to perform a voltage down-conversion. This allows the personal care appliance to be supplied with power using the power supply device, which may be engaged with a mains outlet.

The power supply device may be configured as a power supply cord.

The power supply device may comprise a stand operative to support an appliance (such as a personal care appliance) received thereon.

A kit according to an embodiment comprises the personal care appliance of an embodiment and a power supply device comprising the power plug of an embodiment, the power supply device being operative to provide power to the personal care appliance.

The socket and power plug may be configured such that the socket circumferential wall is spaced by a gap from the circumferential connector wall when the power plug is operatively engaged with the socket. This further reduces the risk of adverse effects that could be caused by electric creep current.

The third circumferential wall segment may comprise or may be a frustoconical or cylinder segment shape extending over a first arc angle.

The third circumferential connector wall segment may comprise or may be another frustoconical or cylinder segment shape extending over a second arc angle.

The second arc angle may be different from the first arc angle.

A kit according to an embodiment comprises a first personal care appliance comprising a first housing having a first socket, the first socket having a first socket geometry selected from a set of two or more different socket geometries that are each assigned to a different one of several ingress protection, IP, classes, the first socket geometry being assigned to a first IP class; and a power supply device comprising a power plug, the power plug having a plug geometry selected from a set of two or more different plug geometries that are each assigned to a different one of the two or more IP classes.

The kit may be operative to encode an IP class in its socket geometry, preventing insertion of plugs that are not compatible with the IP class of the appliance.

The first socket may be shaped to allow insertion of the power plug when the plug geometry is assigned to an IP class that is equal to the first IP class, allow insertion of the power plug when the plug geometry is assigned to an IP class that is higher than the first IP class, and prevent insertion of the power plug when the plug geometry is assigned to an IP class that is lower than the first IP class.

Thus, the first socket may be operative to encode an IP class in its first socket geometry, preventing insertion of plugs that are not compatible with the IP class of the appliance.

The power supply device may be a first power supply device and the power plug may be a first power plug having a first plug geometry assigned to the first IP class.

The kit may further comprise a second power supply device comprising a second power plug, the second power plug having a second plug geometry selected from the set of two or more different plug geometries, the second plug geometry being assigned to a second IP class higher than the first IP class.

The first socket may be shaped to allow insertion of the first power plug and to allow insertion of the second power plug.

Thus, the first socket geometry may ensure that the appliance is usable in association with power supply devices that are designed to have at least the same IP class as the appliance.

The kit may further comprise a second personal care appliance comprising a second housing having a second socket, the second socket having a second socket geometry selected from the set of two or more different socket geometries, the second socket geometry being assigned to the second IP class.

The second socket may be shaped to prevent insertion of the first power plug and to allow insertion of the second power plug.

Thus, the second socket geometry may ensure that the appliance is not usable in association with power supply devices that are designed to have a lower IP class than the appliance.

The first personal care appliance may be a first personal care appliance according to an embodiment, and/or the power plug may be a power plug according to an embodiment.

A method according to an embodiment is performed using a first personal care appliance comprising a first housing having a first socket, the first socket having a first socket geometry selected from a set of two or more different socket geometries that are each assigned to a different one of several ingress protection, IP, classes. The method comprises using a projection of the first socket geometry to selectively allow insertion of power plugs and to selectively prevent insertion of other power plugs, depending on the IP class of the power plugs.

The first socket geometry may be assigned to a first IP class.

The method may further use a power supply device comprising a power plug, the power plug having a plug geometry selected from a set of two or more different plug geometries that are each assigned to a different one of the two or more IP classes. The method may comprise allowing, by the projection, insertion of the power plug into the socket if the power plug is assigned to an IP class that is compatible with that of the appliance. The method may comprise preventing, by the projection, insertion of the power plug into the socket if the power plug is assigned to an IP class that is compatible with that of the appliance.

The method may comprise encoding an IP class in its socket geometry, preventing insertion of plugs that are not compatible with the IP class of the appliance.

The first socket may be shaped to allow insertion of the power plug when the plug geometry is assigned to an IP class that is equal to the first IP class, allow insertion of the power plug when the plug geometry is assigned to an IP class that is higher than the first IP class, and prevent insertion of the power plug when the plug geometry is assigned to an IP class that is lower than the first IP class.

Thus, the socket may be operative to encode an IP class in its first socket geometry, preventing insertion of plugs that are not compatible with the IP class of the appliance.

The power supply device may be a first power supply device and the power plug may be a first power plug having a first plug geometry assigned to the first IP class.

The method may further comprise using a second power supply device comprising a second power plug, the second power plug having a second plug geometry selected from the set of two or more different plug geometries, the second plug geometry being assigned to a second IP class higher than the first IP class.

The method may comprise allowing, by the first socket, insertion of the first power plug and insertion of the second power plug.

Thus, the socket geometry may ensure that the appliance is usable in association with power supply devices that are designed to have at least the same IP class as the appliance.

The method may comprise using a second personal care appliance comprising a second housing having a second socket, the second socket having a second socket geometry selected from the set of two or more different socket geometries, the second socket geometry being assigned to the second IP class.

The second socket may be shaped to prevent insertion of the first power plug and to allow insertion of the second power plug.

Thus, the socket geometry may ensure that the appliance is not usable in association with power supply devices that are designed to have a lower IP class than the appliance.

The first personal care appliance may be a first personal care appliance according to an embodiment, and/or the power plug may be a power plug according to an embodiment.

The method may be a method of using a projection and/or notch geometry to enforce conformity of IP classes of a power supply device and an appliance.

FIG. 1 shows a kit 10. The kit 10 comprises one or several personal care appliances and one or several power supply devices. In FIG. 1, there is shown a kit 10 that comprises a shaver 11, a toothbrush 12, and a first, second and third power supply device 40. A first appliance 11, 12 and first power supply device 40 and its respective housings may support a specific first IP watertightness standard and be sealed against water accordingly. A second appliance 11, 12 and second power supply device 40 and its respective housings may support a specific second IP watertightness standard and be sealed against water accordingly. A third appliance 11, 12 and third power supply device 40 and its respective housings may support a specific third IP watertightness standard and be sealed against water accordingly. The IP standard of the third thus formed kit may be the lowest. The IP standard of the second thus formed kit may be the highest. The second kit has an IP standard between the first and the second.

The appliances 11, 12 may be personal care appliances. The appliances 11, 12 may respectively be selected from a group comprising devices for hair removal, cutting, or trimming (such as a shaver, body groomer, etc.) and oral care devices (such as a toothbrush, oral shower, tongue cleaner, etc.). Each personal care appliance 11, 12 may respectively comprise a housing 30. The housing 20, 30 may respectively comprise a connector. The connector may be configured as a female connector. The connector may comprise a socket 21, 31 and at least two electric contacts (such as pins) which may extend, at least in part, into the socket.

The power supply device 40 may comprise a power plug 43 operative for engagement with the connector of at least one of the appliances 11, 12. The power plug 43 may be a male connector. The power plug 43 may comprise a connector operative to be inserted into the socket 21, 31. The power plug may comprise at least two electric contacts (such as sleeves) which may be operative for conductive abutment with the electric contacts extending in the socket 21, 31, provided that the socket 21, 31 affords insertion of the respective plug 43.

The power supply device 40 may be a power cord having a connector 41 for engagement with a mains outlet at one end and the power plug 43 at the other end. A cable 42 with two or more conductors may extend to the power plug 43. The power supply device 40 may comprise at least one converter operative to perform a voltage down-conversion. The converter may be operative to convert a grid voltage of, e.g., 110 or 230 V to a power supply voltage which is lower, e.g., a low voltage such as a voltage in the range between 2 and 18 V; in the range between 4 and 12 V, or of 5V or 12V.

Alternatively, or additionally, the power supply device 40 may comprise a stand on which an appliance 11, 12 may be received. The power plug 43 may be arranged on or integrated with the stand such that the power plug 43 can provide power to an appliance positioned on the stand.

Geometric features of the connectors of the appliances and/or of the power plugs that are insertable thereinto will be described in more detail below with reference to FIG. 2 to FIG. 24.

The connector(s) of the appliance and/or power supply device may be designed to provide any one or any combination of various effects.

The connector(s) of the appliance and/or power supply device may be designed to mitigate the risk of electric creep current. This in turn increases device lifetime. This may be attained using various techniques that may be used in isolation or in combination, including the provision of geometric features that increase the electric creep distance and/or reduce the risk of water accumulating in the socket of the appliance.

Alternatively, or additionally, the connector(s) of the appliance and/or power supply device may be designed to provide a platform of combining appliances and power supply devices. Geometric features of the connector(s)) of the appliance and/or power supply device may be implemented in such a way that a male connector geometry may be operative for engagement with several female connector geometries. Different male connector geometries may be associated with certain power supply device characteristics (such as a different ingress protection (IP) class (IPC)). Different female connector geometries may be associated with certain appliance characteristics (such as a different ingress protection (IP) class (IPC)). The geometries may be implemented in such a manner that at least one male connector type is insertable in each of the female connector types; and/or that at least one other male connector type is insertable in at least one female connector type while being prevented from being inserted in at least another female connector type; and/or at least yet another male connector type is insertable in only one female connector type while being prevented from being inserted in at least another female connector type. The platform provides versatility in the sense that a power plug of a power supply device having, e.g., a high IPC may be used not only on appliances of the same IPC but also on appliances having a lower IPC.

The different connector geometries (both male and female) may be implemented by projections and/or notches of various sizes, shapes, and/or positions.

The projections and/or notches may also prevent undesired reverse polarity mating of male and female connectors, which can adversely affect the appliance.

Figure 2:
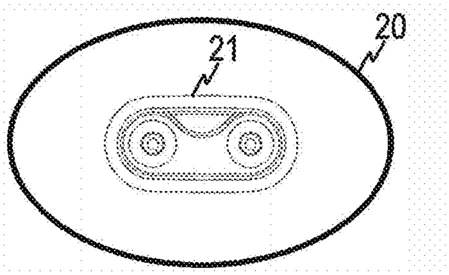
FIG. 2 is a partial view of a personal care appliance.
Figure 3:
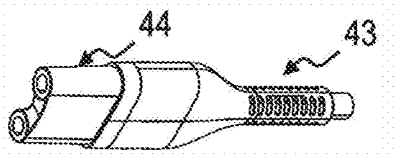
FIG. 3 is a partial view of a power supply device.

FIGS. 2 and 3 are detail views of an appliance and power plug, respectively. FIG. 2 shows an end of a housing 20 of an appliance that comprises a socket 21. The socket 21 has a projection. Additional features that may be implemented in the socket 21 are described below. FIG. 3 shows a perspective view of a power plug 43. The power plug 43 comprises a connector 44. The connector 44 has a notch. Additional features that may be implemented in the power plug 43 are described below.

Figure 4:
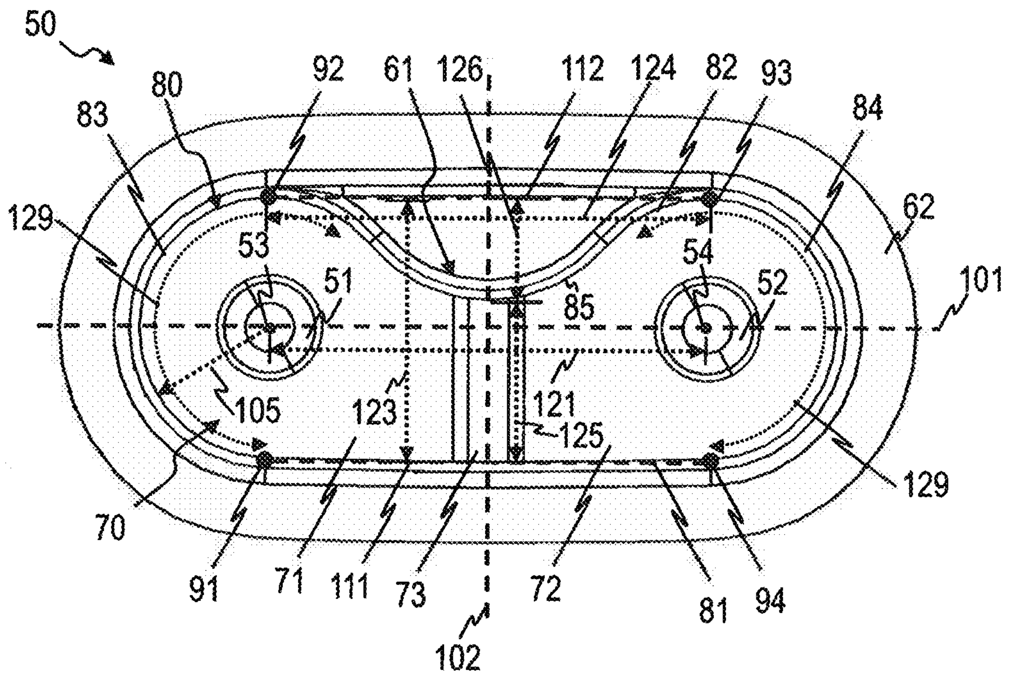
FIG. 4 is a plan view of a socket of a personal care appliance.
Figure 5:
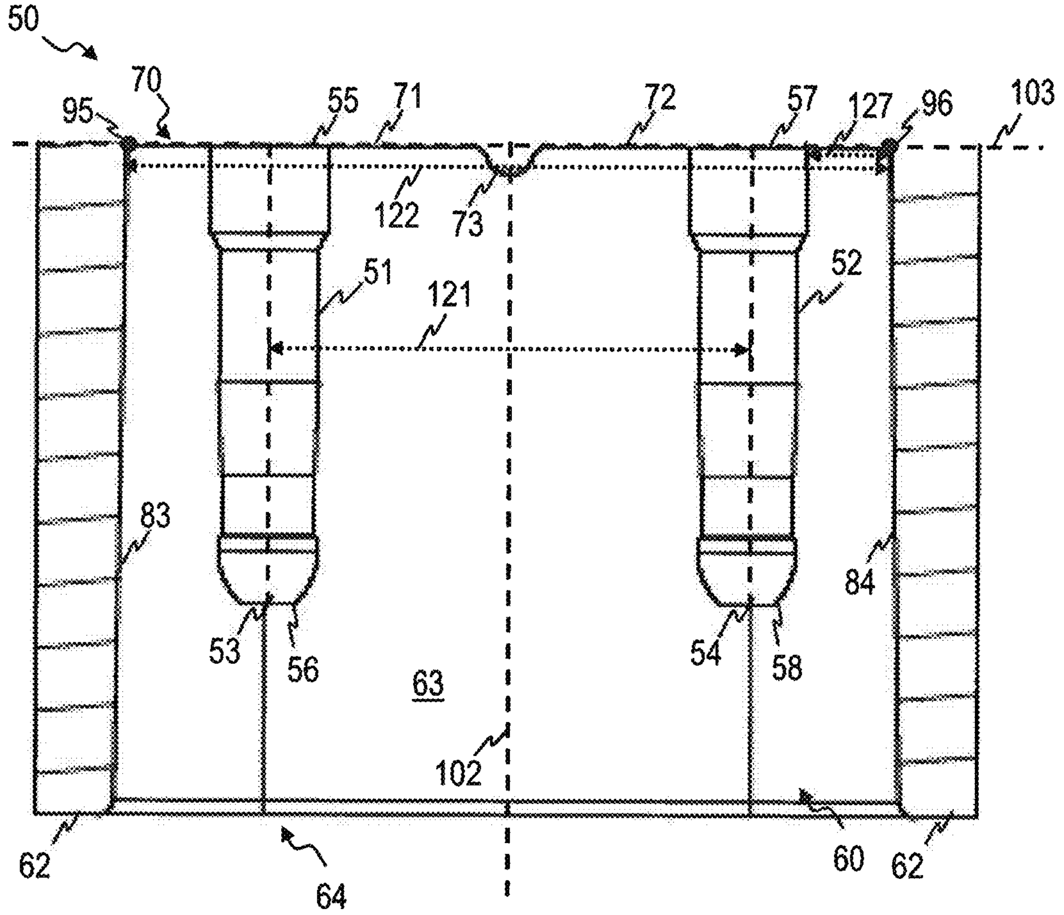
FIG. 5 is a cross-sectional view of the socket of FIG. 4.

FIGS. 4 and 5 show a female connector 50 of an appliance. The female connector has a first socket geometry. FIG. 4 shows a plan view. FIG. 5 shows a cross-sectional view.

The female connector 50 comprises a socket 60 formed in or by a housing of the appliance. The socket 60 is defined by a socket bottom wall 70 and a socket circumferential wall 80.

The socket 60 has a socket cavity 63. The socket cavity 63 is operative to receive a plug connector. The socket cavity 63 may be operative to receive plug connectors having one, two, or more than two pre-defined plug connector geometries. The socket 60 has a socket insertion opening 64 through which the plug connector is insertable into the socket cavity 63. The socket insertion opening 64 may be surrounded by a circumferential rim 62.

The socket cavity 63 may be delimited by or otherwise provided with the socket bottom wall 70 and the socket circumferential wall 80.

The socket bottom wall 70 may comprise a first bottom wall segment 71 and a second bottom wall segment 72. The first and second bottom wall segments 71, 72 may be co-planar. The first and second bottom wall segments 71, 72 may extend in a socket bottom plane 103 (which is also referred to as third plane 103 herein). The socket bottom wall 70 may further comprise a rib 73, which will be described in more detail below. The rib 73 may extend from the socket bottom plane 103 towards the socket insertion opening 64.

The socket circumferential wall 80 may comprise a first circumferential wall segment 81, a second circumferential wall segment 82, a third circumferential wall segment 83 that is curved, intersects the first plane 101, and interconnects the first wall segment 81 and the second wall segment 82, and a fourth circumferential wall segment 84 that is curved, intersects the first plane 101, and interconnects the first wall segment 81 and the second wall segment 82. The socket circumferential wall may consist of the first to fourth circumferential wall segments 81-84.

The first and second circumferential wall segments 81, 82 may be arranged to face each other. The first and second circumferential wall segments 81, 82 may be arranged on opposite longer sides of the socket (which longer side is also referred to as width direction herein and in the art).

The first and second circumferential wall segments 81, 82 may have different shapes, as will be explained in more detail below. The second circumferential wall segment 82 may comprise a projection 61. The first circumferential wall segment 81 may be free from a projection. The first circumferential wall segment 81 may be planar.

The third and fourth circumferential wall segments 83, 84 may be arranged to face each other. The third and fourth circumferential wall segments 83, 84 may be arranged on opposite shorter sides of the socket (which shorter side is also referred to as height direction herein and in the art). The third and fourth circumferential wall segments 83, 84 may each curve from the first circumferential wall segment 81 to the second circumferential wall segment 82. An intersection of the third and fourth circumferential wall segments 83, 84 with a plane (in particular with any plane) that is perpendicular to the first central axis 51 and intersects the third and fourth circumferential wall segments 83, 84 may be an arc of an ellipse, such as a semicircle or other elliptical arc. Alternatively, or additionally, an intersection of the third and fourth circumferential wall segments 83, 84 with a plane (in particular with any plane) that is perpendicular to the socket bottom plane 103 and intersects the third and fourth circumferential wall segments 83, 84 may be a straight line. The third and fourth circumferential wall segments 83, 84 may be shaped as cylinder segments or conical segments, without being limited thereto.

The third circumferential wall segment 83 may have a shape that corresponds to that of an angular segment (or arc) of a frustoconical surface or a cylindrical surface (as seen from the inside). This frustoconical or cylindrical arc segment may extend over an angle 129. The angle 129 may be at least 170°.

The fourth circumferential wall segment 84 may have a shape that corresponds to that of an angular segment (or arc) of a frustoconical surface or a cylindrical surface (as seen from the inside). This frustoconical or cylindrical arc segment may extend over an angle 129. The angle 129 may be at least 170°. The angles 129 over which the third and fourth circumferential wall segments 83, 84 extend may be equal to each other, without being limited thereto.

The first to fourth circumferential wall segments 81-84 may each extend from a root at the bottom wall portion 70 to a free end. The free ends may define the circumferential rim 62 that surrounds the socket insertion opening 62.

The first circumferential wall segment 81 may transition into the third circumferential wall segment 83 along a line that may extend from the root at the bottom wall portion 70 to a free end at the circumferential rim 62. An intersection of this transition line with the third plane 103 is shown as point 91 in FIG. 4.

The third circumferential wall segment 83 may transition into the second circumferential wall segment 82 along a line that may extend from the root at the bottom wall portion 70 to a free end at the circumferential rim 62. An intersection of this transition line with the third plane 103 is shown as point 92 in FIG. 4.

The second circumferential wall segment 82 may transition into the fourth circumferential wall segment 84 along a line that may extend from the root at the bottom wall portion 70 to a free end at the circumferential rim 62. An intersection of this transition line with the third plane 103 is shown as point 93 in FIG. 4.

The fourth circumferential wall segment 84 may transition into the first circumferential wall segment 81 along a line that may extend from the root at the bottom wall portion 70 to a free end at the circumferential rim 62. An intersection of this transition line with the third plane 103 is shown as point 94 in FIG. 4.

The female connector 50 comprises a first connector pin 51 and a second connector pin 52. At least a part of the first connector pin 51 and at least a part of the second connector pin extends 52 within the cavity 63 of the socket. The first connector pin 51 has a first center axis 53. The second connector pin 52 has a second center axis 54. The first center axis 53 and the second center axis 54 are spaced by a pin distance 121.

The first and second connector pins 51, 52 are formed of a conductive material. The first and second connector pins 51, 52 may be metallic connector pins.

The first center axis 53 and the second center axis 54 may be parallel to each other. The first center axis 53 and the second center axis 54 may define a first plane 101 in which the first and second center axes 53, 54 extend.

A second plane 102 is perpendicular to the first plane 101. The second plane 102 may extend parallel to the first center axis 53 and the second center axis 54. The second plane 102 may be equally spaced from the first center axis 53 and the second center axis 54.

The first and second circumferential wall segments 81, 82 may be arranged on opposing sides relative to the first plane 101.

The third and fourth circumferential wall segments 83, 84 may be arranged on opposing sides relative to the second plane 102.

The socket may have a socket width 122. The socket width may correspond to a maximum extension of the socket along the longer one of the two axes of the socket as seen in plan view. The socket width 122 may be determined as spacing between first and second intersection points 95, 96 at which both the first plane 101 and the third plane 103 intersect the third circumferential wall segment 83 and the fourth circumferential wall segment 84.

The socket may have a socket height 123. The socket height may correspond to a maximum extension of the socket along the shorter one of the two axes of the socket as seen in plan view. The socket height 123 may be determined using any one of the following techniques:

- determining an intersection line 111 of the first circumferential wall 81 and the third plane 103; determining point(s) 92, 93 at which an intersection of the circumferential wall and the third plane 103 has maximum distance from the intersection line 111; determining the distance of the point(s) 92, 93 from the intersection line 111 as socket height 123.
- determining an intersection line 111 of the first circumferential wall 81 and the third plane 103; determining point(s) 92, 93 at which, in an intersection in the third plane 103, the third and fourth circumferential wall segments 83, 84 transition into second circumferential wall segment 82; determining a maximum one of the two distances of the point(s) 92, 93 from the intersection line 111 as socket height 123.
- determining points 91, 92 as intersections of the first plane 101, a plane that is parallel to the second plane 102 and passes through the first center axis 53, and the circumferential socket wall 70; and determining the socket height 123 as distance between these points 91, 92;
- determining points 93, 94 as intersections of the first plane 101, a plane that is parallel to the second plane 102 and passes through the second center axis 54, and the circumferential socket wall 70; and determining the socket height 123 as distance between these points 93, 94;
- determining a radius of curvature 105 of an intersection of the third or fourth circumferential wall 83, 84 with the third plane; determining the socket height as being two times the radius of curvature 105.

A ratio of the radius of curvature 105 to the pin distance 121 is at most 0.35. By maintaining the ratio of the radius of curvature to the pin distance to be at most 0.35, the risk of electrical creepage can be reduced. Electrical creep resistance is made large by spacing the connector pins by a pin distance that is sufficiently large, compared to the radius of curvature, that the ratio of the radius of curvature to the pin distance is at most 0.35.

As will be described in more detail below, the second circumferential wall segment 82 may have a projection segment 85. The projection segment 85 forms a projection 61 in the socket 60. The projection 61 provides a decrease in socket height, measured along the second plane 102, as seen in plan view (see FIG. 4). At the projection 61, the second circumferential wall segment 82 projects towards the first circumferential wall segment 81. For illustration, in any plane that coincides with or is parallel to the third plane 103 and that intersects the circumferential wall segment, the projection 61 may project towards the first circumferential wall segment 81 compared to points 92, 93 on the second circumferential wall segment 82 that are spaced from the first circumferential wall segment 81 by a maximum distance.

The projection 61 causes the socket 60 to have a reduced socket height 125 at the projection 61. The reduced socket height 125 at the projection 61 may be determined by: determining an intersection line 111 of the first circumferential wall 81 and the third plane 103; determining a further intersection line of the second circumferential wall 82 and the third plane 103; and determining the reduced socket height 125 at the projection 61 as minimum distance, measured perpendicular to the intersection line 111 of any point on the further intersection line from the intersection line 111.

The projection 61 has a projection height 126. The projection height 126 indicates how far the projection projects towards the first circumferential wall segment 81. The projection height 126 may be determined as socket height 123 minus the reduced socket height 125 at the projection 61.

The projection 61 may extend from the socket bottom wall 70 to the circumferential rim 62. The projection 61 may extend continuously from the socket bottom wall 70 to the circumferential rim 62.

The first connector pin 51 projects from the first bottom wall segment 71. The second connector pin 52 projects from the second bottom wall segment 72. A rib 73 may be provided between the first and second bottom wall segments 71, 72. The rib 73 may project from at least one of, preferable from both of the first and second bottom wall segments 71, 72. The rib 73 may project from the socket bottom plane 103 towards the socket insertion opening 64.

The rib 73 may extend from the first circumferential wall segment 81 to the second circumferential wall segment 82. The rib 73 may extend continuously from the first circumferential wall segment 81 to the second circumferential wall segment 82. The rib 73 may have a substantially constant cross-section as it extends along the second plane 102 from the first circumferential wall segment 81 to the second circumferential wall segment 82. Alternatively, the cross-section of the rib 73 may vary and/or the rib 73 need not extend all the way between the first and second circumferential wall segments 81, 82.

An effect of the rib 73 is that it increases the electric creep distance through any fluid that might be left in the socket 60. Electric resistance is thereby increased, and electric creepage is decreased. Adverse effects that would otherwise result from electric creep current, such as the risk of electrolysis, are mitigated.

The projection 61 may also be operative to provide various effects. The projection 61 reduces the socket height in a center region between the first and second connector pins 51, 52, which may also contribute to increasing electric creep resistance and/or reducing electric creepage. The projection 61 may provide protection against reverse polarity insertion of a power plug. The projection 61 may be operative to define, by virtue of its geometry (such as size and position) which power plugs are insertable into the socket 60. Thus, the projection 61 may be operative to allow power plugs to be inserted into the socket which have characteristics (such as IP characteristics) that are consistent with those of the appliance and/or to prevent insertion of power plugs into the socket which have characteristics (such as IP characteristics) that are not consistent with those of the appliance.

The socket 60 may have geometrical features that contribute to enhanced characteristics by mitigating the risk of electric creepage and/or mitigating the risk of insertion of inappropriate power plugs.

A ratio of the pin distance 121 to the socket width 122 may be at least 0.60, at least 0.61, or at least 0.62. In a socket having such a configuration, the connector pins 51, 52 are spaced comparatively far apart, which further decreases the risk of creep currents compared to conventional connector configurations.

A ratio of the socket height 123 to the socket width 122 may be at most 0.60, at most at most 0.50, at most 0.45, or at most 0.40. A ratio of the socket height 123 to the pin distance 121 may be at most 0.76, at most 0.70, at most 0.65, at most 0.60, at most 0.55, at most at most 0.45, or at most 0.40. When the socket 60 has such a configuration, the risk of creep current is further decreased. Placement of a screw or bolt head adjacent to and outside the socket 60 is facilitated, as will be described later, which further decreases the risk of creep current.

A ratio of the radius of curvature 105 of the third and/or fourth circumferential wall segments 83, 84 to the socket width 122 may be at most 0.20. Alternatively, or additionally, a ratio of the radius of curvature 105 to the pin distance 121 may be at most 0.35, or at most 0.33. Such a configuration further decreases the risk of creep current and allows a screw or bolt head to be positioned separately from and adjacent to the socket, as will be described later, which further decreases the risk of creep current.

A distance 127 between the first or second connector pin 51, 52 and the third or fourth circumferential wall segments 83, 84 extending about the first and second center axes 53, 54, respectively, may be less than 2.0 mm, less than 1.9 mm, less than 1.8 mm, less than 1.7 mm, less than 1.6 mm, less than 1.5 mm, less than 1.4 mm, less than 1.3 mm, less than 1.2 mm, or less than 1.1 mm. Alternatively or additionally, a ratio of the pin distance 121 to the distance 127 between connector pin and third/fourth circumferential wall segment may be at least 4, at least 5, at least 6, or at least 7. The small spacing between connector pin 51, 52 and third/fourth circumferential wall segment 83, 84 allows the pins to be spaced far apart, reducing the risk of electric creep current.

The projection 61 may have a projection width 124, measured along a width direction of the socket 60 (e.g., in the third plane 103). The projection width 124 may be determined as a distance along the width direction between first and second projection segment ends 92, 93 at which the second circumferential wall segment 82 starts curving inward relative to a plane 112 interconnecting ends of the third and fourth circumferential wall segments 83, 84. For illustration, the projection width 124 may be obtained by:

determining a curve of intersection of the second circumferential wall segment 82 and the third plane 103, determining ends 92, 93 of the projection segment 85 as outermost points of a segment on this curve of intersection at which the curve of intersection is spaced from the first plane by a distance less than a maximum distance 123 as determined by the ends of the third and fourth circumferential wall segments 83, 84, and determining the projection width 124 as distance between these outermost points 93, 94 that define the projection width. A ratio of the projection width 124 to the socket width 122 may be at least 0.60 or at least 0.61. When the socket has such a configuration, the projection width 124 is comparatively large. The constriction formed in the bottom wall by such a wide projection may further reduce the risk of electrolysis by reducing the risk of electric creepage.

A ratio of the projection height 126 to the radius of curvature 105 of the third and fourth circumferential wall segments 83, 84 may be at least 0.50, at least 0.55, at least 0.60, at least at least 0.70, at least 0.75, at least 0.80, at least 0.85, at least 0.90, or at least 0.95. Alternatively, or additionally, a ratio of the projection height 126 to the socket height 123 may be at least 0.15, at least 0.20, or at least 0.25. When the socket has such a configuration, the projection height 126 is comparatively large compared to conventional female connectors. The large projection height 126 facilitates configurations in which a screw or bolt head can be positioned separately from and adjacent to the socket, which further decreases the risk of electric creepage and electrolysis.

Figure 6:
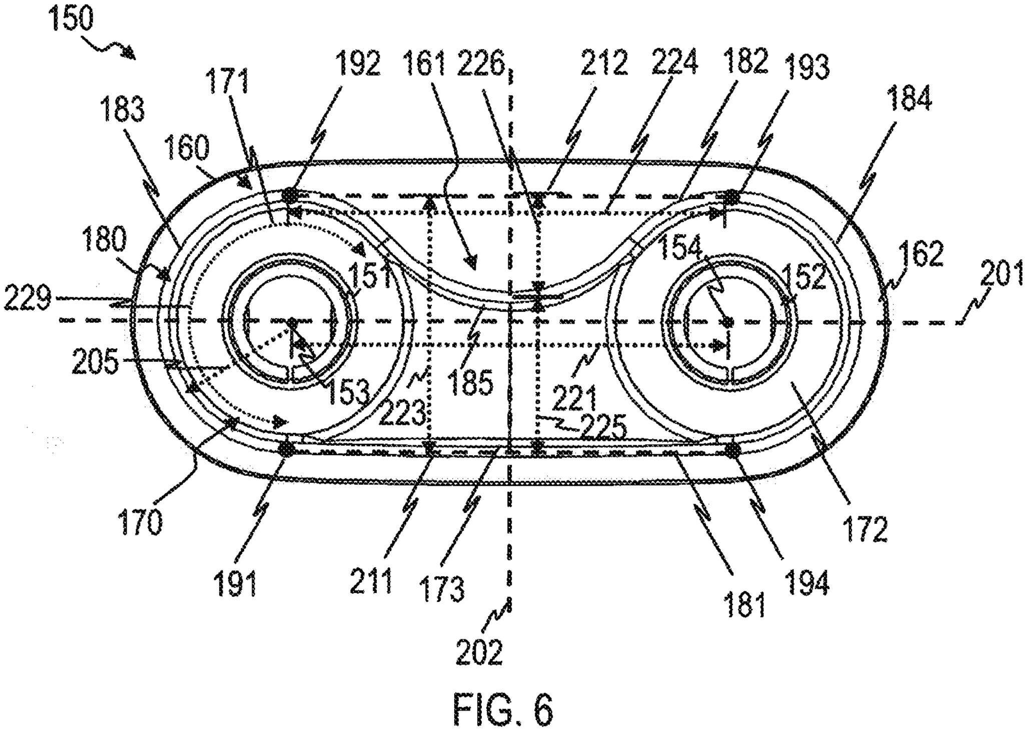
FIG. 6 is a plan view of a plug of a power supply device.
Figure 7:
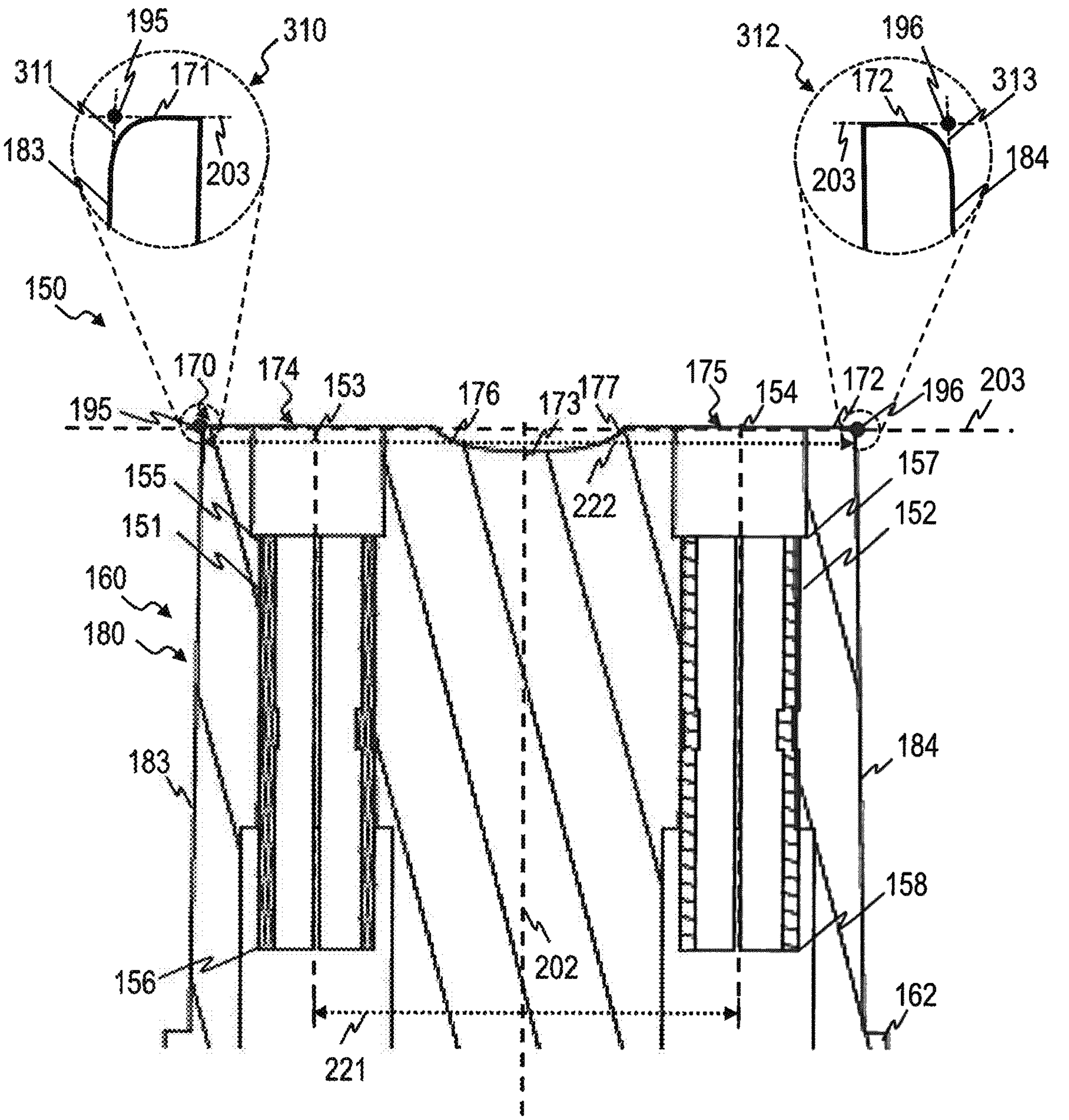
FIG. 7 is a cross-sectional view of the plug of FIG. 6.
Figure 8:
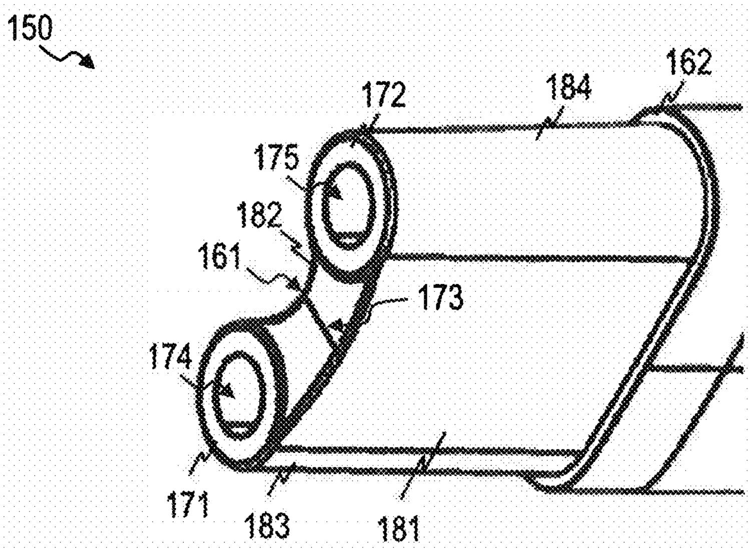
FIG. 8 is a perspective view of a connector of the plug of FIG. 6.
Figure 9:
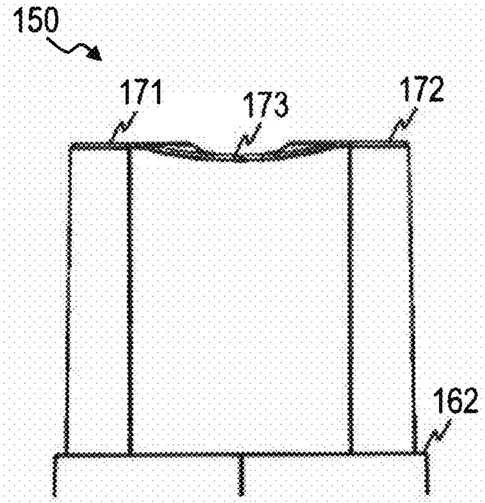
FIG. 9 is a plan view of the plug of FIG. 6.
Figure 10:
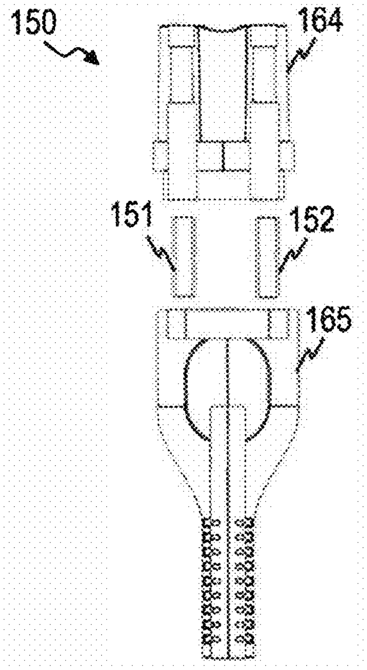
FIG. 10 is an exploded view of the plug of FIG. 6.
Figure 11:
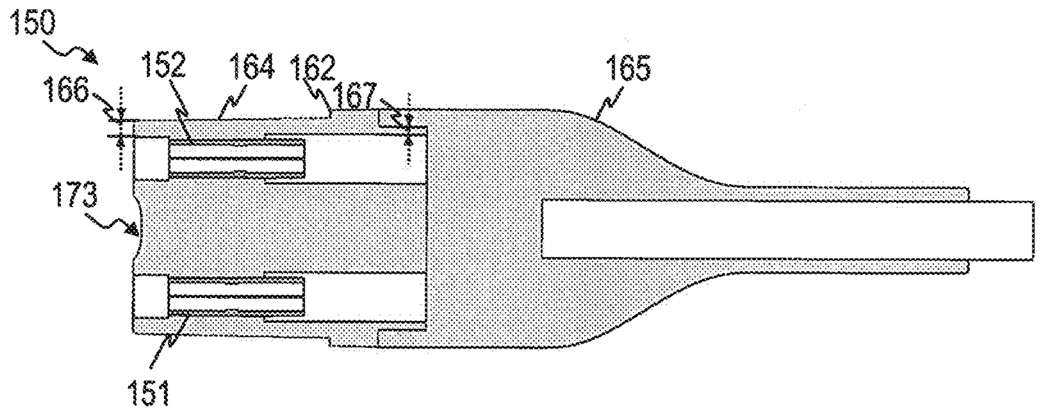
FIG. 11 is a cross-sectional view of the plug of FIG. 6.
Figure 12:
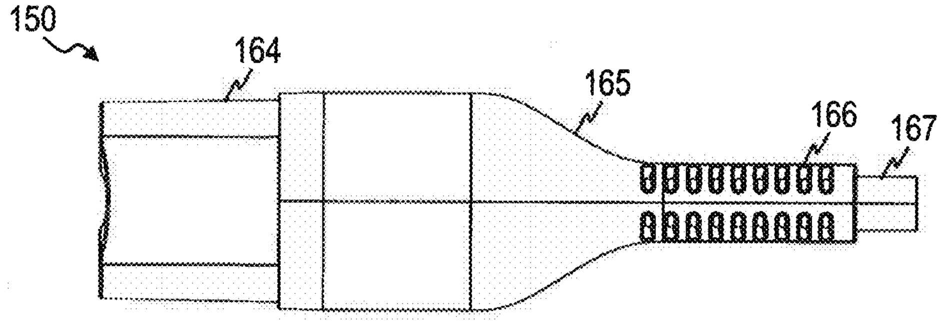
FIG. 12 is another plan view of the plug of FIG. 6.

FIGS. 6 to 12 show a power plug 150. The power plug 150 may be operative for insertion into the socket 50. FIG. 6 shows a plan view of the power plug. FIG. 7 shows a cross-sectional view. FIG. 8 shows a partial perspective view. FIG. 9 shows a partial planar side view. FIG. 10 shows an exploded view. FIG. 11 shows a cross-sectional view. FIG. 12 shows a planar side view.

The power plug 150 comprises a male connector 160. The male connector 160 is operative for insertion into a mating socket of an appliance (such as socket 50).

The power plug 150, and more specifically the male connector 160, may comprise a first connector sleeve 151 and a second connector sleeve 152. The first and second connector sleeves 151, 152 may be operative to receive connector pins 52, 51 therein. The first and second connector sleeves 151, 152 are formed of a conductive material. The first and second connector sleeves 151, 152 may be metallic sleeves.

The first connector sleeve 151 has a first sleeve center axis 153. The second connector sleeve 152 has a second sleeve center axis 154. The first sleeve center axis 153 and the second sleeve center axis 154 may be parallel to each other. The first sleeve center axis 153 and the second sleeve center axis 154 may be spaced by a sleeve distance 221. The first sleeve center axis 153 and the second sleeve center axis 154 may define a first plane 201. When the male connector 160 is inserted into the socket, the first plane 201 of the power plug may coincide with the first plane 101 of the appliance socket.

A second plane 202 may be perpendicular to the first plane 201. The second plane 202 may extend parallel to the first sleeve center axis 153 and the second sleeve center axis 154. The second plane 202 may be equally spaced from the first sleeve center axis 153 and the second sleeve center axis 154. When the male connector 160 is inserted into the socket, the second plane 202 of the power plug may coincide with the second plane 102 of the appliance socket.

The end surface 170 may comprise a first end surface segment 171 extending transverse, e.g. perpendicular, to the first and second planes 201, 202. The first end surface segment 171 may comprise the first connector pin insertion opening 174.

The end surface 170 may comprise a second end surface segment 172 extending transverse to the first and second planes 201, 202. The second end surface segment may comprise the second connector pin insertion opening 175.

The first and second end surface segments 171, 172 may be planar. The first and second end surface segments 171, 172 may have an annular shape extending around the first and second pin insertion openings 174, 175, respectively.

The end surface 170 may comprise a groove segment extending from the first end surface segment 171 to the second end surface segment 172 and defining a groove 173. The groove 173 is arranged on the end surface 170 and between the first end surface segment 171 and the second end surface segment 172.

The power plug 150 may further comprise a circumferential connector wall 180 that may extend from a circumference of the end surface 170.

The circumferential connector wall 180 may comprise a first circumferential connector wall segment 181, a second circumferential connector wall segment 182, a third circumferential connector wall segment 183 that is curved, intersects the first plane 201, and interconnects the first circumferential connector wall segment 181 and the second circumferential connector wall segment 182, and a fourth circumferential connector wall segment 184 that is curved, intersects the first plane 201, and interconnects the first circumferential connector wall segment 181 and the second circumferential connector wall segment 182.

The first and second circumferential connector wall segments 181, 182 may be arranged to face each other. The first and second circumferential connector wall segments 181, 182 may be arranged on opposite longer sides of the socket (which longer side is also referred to as width direction herein and in the art).

The first and second circumferential connector wall segments 181, 182 may have different shapes, as will be explained in more detail below. The second circumferential wall segment 182 may comprise a notch 161. The first circumferential wall segment 181 may be free from a notch. The first circumferential wall segment 181 may be planar.

The third and fourth circumferential connector wall segments 183, 184 may be arranged to face each other. The third and fourth circumferential connector wall segments 183, 184 may be arranged on opposite shorter sides of the socket (which shorter side is also referred to as height direction herein and in the art). The third and fourth circumferential connector wall segments 183, 184 may each curve from the first circumferential connector wall segment 181 to the second circumferential connector wall segment 182. An intersection of the third and fourth circumferential connector wall segments 183, 184 with a plane (in particular with any plane) that is perpendicular to the first and second planes 201, 202 and intersects the third and fourth circumferential connector wall segments 183, 184 may be an arc of an ellipse, such as a semicircle or other elliptical arc. Alternatively, or additionally, an intersection of the third and fourth circumferential connector wall segments 183, 184 with a plane (in particular with any plane) that is parallel to the first and second planes 201, 202 and intersects the third and fourth circumferential connector wall segments 183, 184 may be a straight line. The third and fourth circumferential connector wall segments 183, 184 may be shaped as cylinder segments or conical segments, without being limited thereto. A third plane 203 may be a plane which the first and second end surface segments 171, 172 are arranged. Portions of the third and fourth circumferential connector wall segments 183, 184 that are closest to (e.g. located in) the third plane 203 may comprise circular arcs having a radius of curvature, as explained in more detail below.

The third circumferential connector wall segment 183 may have a shape that corresponds to that of an angular segment (or arc) of a frustoconical surface or a cylindrical surface. This frustoconical or cylindrical arc segment may extend over an angle 229. The angle 229 may be at least 170°.

The fourth circumferential wall segment 184 may have a shape that corresponds to that of an angular segment (or arc) of a frustoconical surface or a cylindrical surface. This frustoconical or cylindrical arc segment may extend over an angle 229. The angle 229 may be at least 170°. The angles 229 over which the third and fourth circumferential connector wall segments 183, 184 extend may be equal to each other, without being limited thereto.

The angle 229 over which the third and fourth circumferential connector wall segments 183, 184 form a circular or elliptical arc may be different from the angle 129 over which the third and fourth circumferential wall segments 83, 84 of a mating female connector form a circular or elliptical arc.

The first to fourth circumferential connector wall segments 181-184 may each extend from a root at a circumferential rim 162 to a free end. The free ends may be arranged at the end surface 170.

The first circumferential connector wall segment 181 may transition into the third circumferential connector wall segment 183 along a line that may extend from the root at the circumferential rim 162 to the free end at the end surface 170. An intersection of this transition line with a third plane 203 (which will be described in more detail below) is shown as point 191 in FIG. 6.

The third circumferential connector wall segment 183 may transition into the second circumferential connector wall segment 182 along a line that may extend from the root at the circumferential rim 162 to the free end at the end surface 170. An intersection of this transition line with the third plane 203 is shown as point 192 in FIG. 6.

The second circumferential connector wall segment 182 may transition into the fourth circumferential connector wall segment 184 along a line that may extend from the root at the circumferential rim 162 to the free end at the end surface 170. An intersection of this transition line with the third plane 203 is shown as point 193 in FIG. 6.

The fourth circumferential connector wall segment 184 may transition into the first circumferential connector wall segment 181 along a line that may extend from the root at the circumferential rim 162 to the free end at the end surface 170. An intersection of this transition line with the third plane 203 is shown as point 194 in FIG. 6.

The groove 173 in the end face may extend along the second plane 202. The groove 173 may extend from the first circumferential connector wall 181 to the second circumferential connector wall 182. The groove segment that forms the groove 173 may be recessed as compared to a plane in which the first and second end surface segments 171, 172 extend.

An intersection of the end surface 170 with the first plane 201 (as shown in FIG. 7) may have a concave shape at the groove 173. A point of the groove 173 that is closest to a plane in which the circumferential rim 162 extends may be located at or close to an intersection of the second plane 202 with the end surface, in a cross-section in the first plane 201.

An intersection of the end surface 170 with the second plane 202 may have a planar or convex shape to facilitate liquid drainage.

The groove 173 may comprise a first sloped portion 176 extending from the first end surface segment 171 and a second sloped portion 177 extending from the second end surface segment 172. The first and second sloped portions 176, 177 may be recessed more strongly from a plane in which the first and second end surface segments 171, 172 are provided with increasing distance from the first and second end surface segments 171, 172, respectively.

The groove 173 may be formed by a V-shaped or U-shaped recess in the end surface 170.

The groove 173 may be operative to provide water drainage. The groove 173 may assist in removal of remnant moisture.

The notch 161 is formed by a notch wall segment 185 of the second circumferential wall segment. The notch 161 is operative to prevent reverse polarity insertion into a socket of an appliance. The notch 161 also mitigates the risk of the power plug 150 being used in association with an appliance having an ingress protection (IP) class (IPC) that is not in conformity with that of a power supply device that comprises the power plug 150 and/or with an appliance that is otherwise not intended to be used on or with the power supply device that comprises the power plug 150.

The third plane 203 may extend perpendicularly to both the first plane 201 and the second plane 202. The third plane 203 may be located such that the first and second end surface segments 171, 172 are arranged therein.

The power plug may have a plug connector width 222, measured along the first plane 201 (e.g., as distance between points 195, 196 located on the third and fourth circumferential connector wall segments 183, 184 and on the first plane 201). A ratio of the sleeve distance 221 to the plug connector width 222 may be at least 0.50, at least 0.55, at least 0.60, or at least 0.62. The sleeve spacing decreases the risk of creep currents during use of the power plug 150.

The first and third planes 201, 203 may intersect the circumferential connector wall 180 at a first point of intersection 195 and the first and third planes may intersect the circumferential connector wall 180 at a second point of intersection 196. The plug connector width 222 may be a distance between the first and second points of intersection 195, 196. A ratio of the sleeve distance 221 to the plug connector width 222 may be at least 0.50, at least 0.55, at least 0.60, or at least 0.62. The sleeve spacing decreases the risk of creep currents during use of the power plug 150.

If the third and fourth circumferential connector wall segments 183, 184 are rounded off towards the end surface 170 (as shown in insets 310, 312 in FIG. 7), the plug connector width 222 may be determined by:

- determining the first point of intersection 195 as intersection point of a first tangential line 311 and the third plane 203, wherein the first tangential line 311 is tangential to the third circumferential connector wall 183 and is located in the first plane 201;
- determining the second point of intersection 196 as intersection point of a second tangential line 313 and the third plane 203, wherein the second tangential line 313 is tangential to the fourth circumferential connector wall 184 and is located in the first plane 201; and
- determining the plug connector width 222 as distance between the first and second points of intersection 195, 196.

The power plug 150 may have a plug connector height 223. The plug connector height 223 may correspond to a maximum extension of the plug connector along the shorter one of the two axes of the plug connector as seen in plan view. The plug connector height 223 may be determined using any one of the following techniques:

- determining an intersection line 211 of the first circumferential connector wall 181 and the third plane 203; determining point(s) 192, 193 at which an intersection of the circumferential connector wall 180 and the third plane 203 has maximum distance from the intersection line 211; determining the distance of the point(s) 192, 193 from the intersection line 211 as plug connector height 223.
- determining an intersection line 211 of the first circumferential connector wall 181 and the third plane 203; determining point(s) 192, 193 at which, in an intersection in the third plane 203, the third and fourth circumferential wall segments 183, 184 transition into second circumferential wall segment 182;
- determining a maximum one of the two distances of the point(s) 192, 193 from the intersection line 211 as plug connector height 223.
- determining points 191, 192 as intersections of the first plane 201, a plane that is parallel to the second plane 202 and passes through the first center axis 153, and the circumferential connector wall 70; and determining the plug connector height 223 as distance between these points 191, 192;
- determining points 193, 194 as intersections of the first plane 201, a plane that is parallel to the second plane 202 and passes through the second center axis 154, and the circumferential connector wall 70; and determining the plug connector height 223 as distance between these points 193, 194;
- determining a radius of curvature 205 of an intersection of the third or fourth circumferential connector wall 183, 184 with the third plane 203; and
- determining the plug connector height 223 as being two times the radius of curvature 205.

A ratio of the radius of curvature 205 to the sleeve distance 221 may be at most 0.35. The sleeve distance 221 that is large compared to the radius of curvature 205 (which is indicative of the connector height) reduces the risk of electric creep currents. The radius of curvature 205 (which is indicative of the connector height) that is small compared to the sleeve distance 221 reduces the amount of liquid that can be introduced into a female connector during use, which in turn also mitigates the risk of electric creepage.

As mentioned above, the second circumferential connector wall segment 182 may have a notch segment 185. The notch segment 185 forms the notch 161 on an external surface of the power plug 150. The notch 161 provides a decrease in socket height, measured along the second plane 202, as seen in plan view (see FIG. 6). At the notch 161, the second circumferential connector wall segment 182 projects towards the first circumferential connector wall segment 181. For illustration, in any plane that coincides with or is parallel to the third plane 203 and that intersects the circumferential connector wall segment, the notch 161 may project towards the first circumferential connector wall segment 181 compared to points 192, 193 on the second circumferential connector wall segment 182 that are spaced from the first circumferential connector wall segment 181 by a maximum distance.

The notch 161 causes the plug connector 160 to have a reduced plug connector height 225 at the notch 161. The reduced plug connector height 225 at the notch 161 may be determined by: determining an intersection line 221 of the first circumferential connector wall 181 and the third plane 203; determining a further intersection line 221 of the second circumferential connector wall 182 and the third plane 203; and determining the reduced socket height 225 at the notch 161 as minimum distance, measured perpendicular to the intersection line 221, of any point on the further intersection line from the intersection line 221.

The notch 161 has a notch height 226. The notch height 226 indicates how far the notch projects towards the first circumferential connector wall segment 181. The notch height 226 may be determined as socket height 223 minus the reduced socket height 225 at the notch 161.

The notch 161 has a notch width 224. The notch width 224 may be measured along a width direction of the plug connector (e.g., in the third plane 203). The notch width 224 may be determined as a distance along the width direction between first and second ends of the notch segment 185 at which the second circumferential connector wall segment 182 starts curving inward relative to a plane 212 interconnecting ends of the third and fourth circumferential connector wall segments 183, 184. or The notch width 224 may be obtained by: determining a curve of intersection of the second circumferential connector wall segment 182 and the third plane 203, determining ends of the notch segment 185 as outermost points of a segment on this curve of intersection at which the curve of intersection is spaced from the first plane 201 by a distance less than a maximum distance as determined by the ends of the third and fourth circumferential connector wall segments 183, 184, and determining the notch width 224 as distance between these outermost points 192, 193 of the notch segment.

The notch 161 may extend from the circumferential rim 162 to the end surface 170. The notch 161 may extend continuously from the circumferential rim 162 to the end surface 170.

The first connector sleeve 151 may be recessed from the end surface 170. The second connector sleeve 152 may be recessed from the end surface 170.

The notch 161 may also be operative to provide various effects. The notch 161 may provide protection against reverse polarity insertion of the power plug 150 into a socket. The notch 161 may be operative to define, by virtue of its geometry (such as size and position) into which sockets the power plug 150 is insertable. Thus, the notch 161 may be operative to allow the power plug to be inserted into sockets of appliances which have characteristics (such as IP characteristics) that are consistent with those of a power supply device that comprises the power plug and/or to prevent insertion of the power plug into sockets of appliances which have characteristics (such as IP characteristics) that are not consistent with those of the power supply device that comprises the power plug.

The power plug 150, and in particular its connector 160, may have geometrical features that contribute to enhanced characteristics by mitigating the risk of electric creepage and/or mitigating the risk of insertion into inappropriate sockets.

A ratio of the plug connector height 123 to the plug connector width 122 may be at most 0.60, at most 0.55, at most 0.50, at most 0.45, or at most 0.40. Alternatively, or additionally, a ratio of the plug connector height 123 to the sleeve distance 121 may be at most 0.60, at most at most 0.50, at most 0.45, or at most 0.40. Such a power plug configuration further reduces the risk of undesired electrolysis during use.

A ratio of the radius of curvature 205 to the plug connector width 222 may be at most a ratio of the radius of curvature to the pin distance may be at most 0.35 or at most 0.33. Such a power plug configuration further reduces the risk of undesired electrolysis during use.

A ratio of the notch width 224 to the sleeve distance 221 may be at least 0.50, at least at least 0.60, at least 0.65, at least 0.70, at least 0.75, at least 0.80, at least 0.85, at least or at least 0.95. Such a power plug configuration further reduces the risk of undesired electrolysis during use.

A ratio of the notch height 226 to the radius of curvature 205 may be at least 0.50, at least 0.55, at least 0.60, at least 0.65, at least 0.70, at least 0.75, at least 0.80, or at least 0.85. Alternatively, or additionally, a ratio of the notch height 226 to the plug connector height 223 may be at least 0.15, at least 0.20, or at least 0.25. Such a power plug configuration further reduces the risk of undesired electrolysis during use.

As shown in FIGS. 10 and 11, the power plug 150 may comprise a first component 164 and a second component 165. The first component 164 may be a first plastic component. The second plastic component 165 may be a second plastic component. The first component 164 may provide the male connector 160, including the end surface 170 and the circumferential connector wall 180.

The second component 165 may form a bend protection.

The second component 165 may provide a connection to a power cable 167. The second component 165 may comprise a bend protection portion 166. In the bend protection portion 166, the second component 165 may extend around a sheath of the power cable 167 received therein. The bend protection portion 166 may be provided with recessed for increased flexibility (as compared to the part of the second component 165 where no recesses are provided).

The first component 164 may be made of a more rigid material than the second component 165. The first component 164 may be made from a material having a first hardness (determined, e.g., as Shore hardness) and the second component 165 may be made from a material having a second hardness (determined, e.g., as Shore hardness).

The higher hardness of the first component 164 makes it less likely that the second circumferential wall segment 182 that defines the notch 161 deflects upon insertion into a socket having a socket geometry type (in particular a projection geometry type) different from that of the power plug connector.

A base end of the first component 164 that is opposite the end surface 170 may have a reduced wall thickness portion 167. The reduced wall thickness portion 167 may be formed by a step feature in the first component 164. The reduced wall thickness portion 167 may extend circumferentially around the first component 164.

The second portion 165 may be over molded on the reduced wall thickness portion 167.

Figure 13:
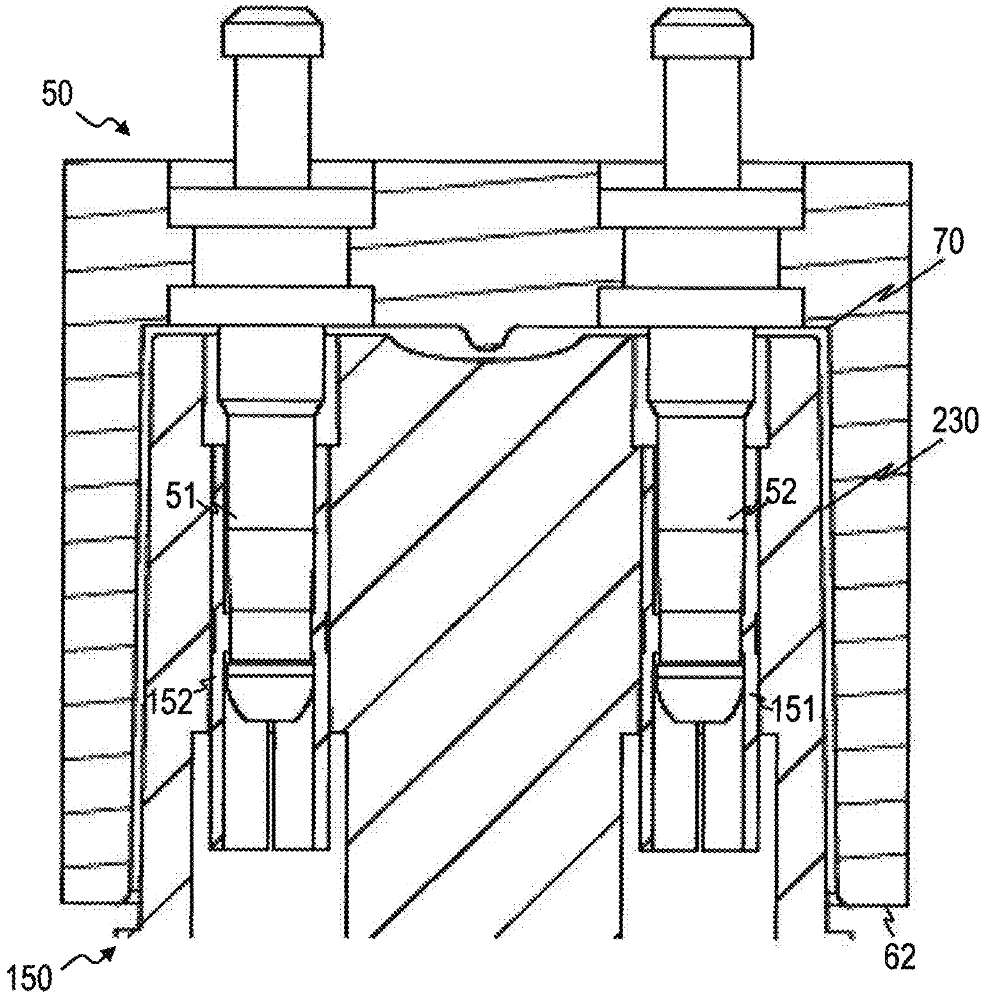
FIG. 13 is a cross-sectional view of the socket of FIG. 4 when engaged with the plug of FIG. 6.

FIG. 13 is a cross-sectional partial view showing the female connector 50 engaged with the male connector 150. The first connector pin 51 is received in the second connector sleeve 152. The second connector pin 52 is received in the first connector sleeve 151.

The plug connector of the power plug 150 and the socket of the appliance are dimensioned and shaped such that, in the engaged state, the (outer) circumferential connector wall 180 of the power plug 150 is spaced from the (inner) circumferential wall 80 of the socket by a gap 230. The gap 230 may be a circumferential gap that extends entirely along the (outer) circumferential connector wall 180 of the power plug 150 is spaced from the (inner) circumferential wall 80 of the socket.

Alternatively, or additionally, the socket bottom wall 70 may remain spaced from the end surface 170 in the engaged state. Removal of remnant liquid is facilitated thereby, reducing the risk of electrolysis.

Figure 14:
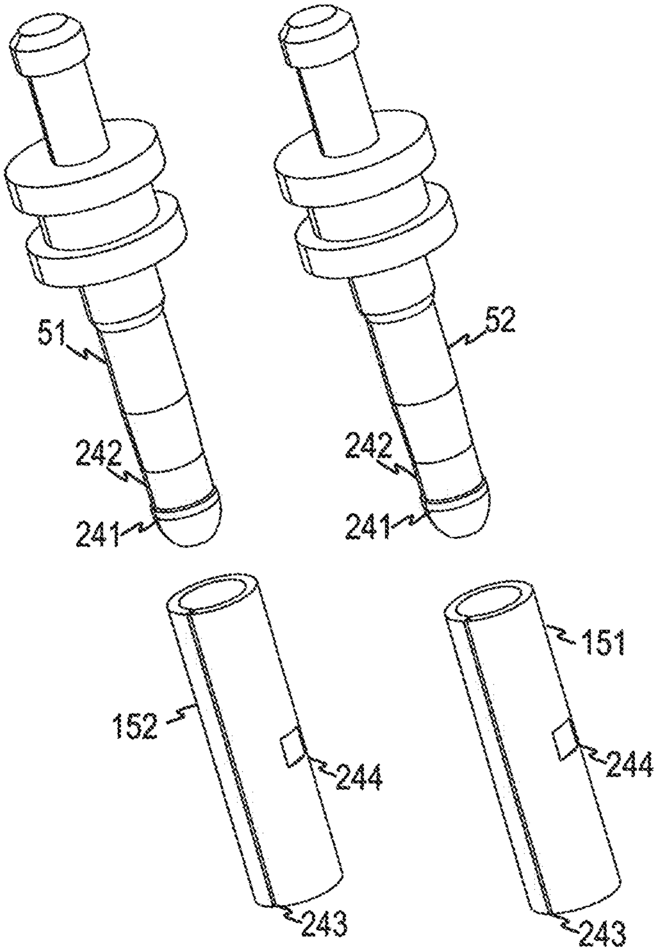
FIG. 14 is an exploded view showing connector pins of the socket and connector sleeves of the plug.

FIG. 14 is a partial exploded view showing connector pins 51, 52 and connector sleeves 151, 152.

The connector pins 51, 52 may each comprise an enlarged diameter portion (such as a thickened end portion) 241 and a reduced diameter portion 242.

The connector sleeves 151, 152 may be formed as slotted metal sleeves that comprise a slot 243 extending along the entire length of the connector sleeves 151, 152 in order to allow widening during connection. The connector sleeves 151, 152 may each comprise a depressed portion 244 arranged to press against the reduced diameter portion 242 of the connector pins 51, 52 to retain the connector pins 51, 52 in a secured state in the mating connector sleeves 152, 151.

The projection of the female connector on the appliance facilitates placement of a screw or bolt head adjacent to and outside the socket, as explained in more detail with reference to FIG. 15.

Figure 15:
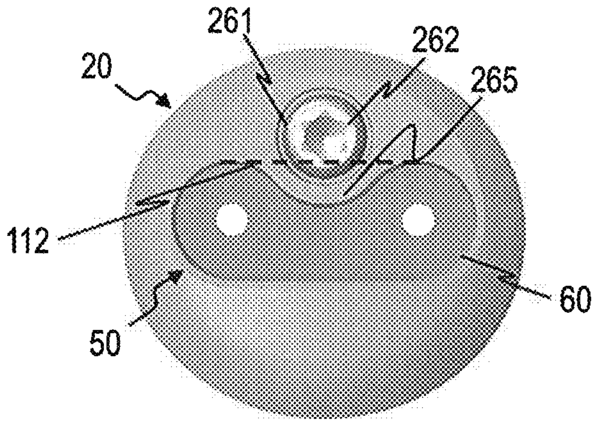
FIG. 15 is a plan view of an end portion of a personal care appliance.

FIG. 15 shows an end face of a housing of an appliance 20. The end face has an insertion opening of a socket of a female connector 50. The socket has a circumferential wall that defines a projection, as explained in detail above. A recess 261 is provided adjacent the socket 60. A head 262 of a screw or bolt is received within the recess 261.

The recess 261 may be positioned adjacent to but separated from the socket 60 by a wall 265. Positioning the recess 261 for the head 262 outside the socket 60 allows the socket 60 to be kept free of a screw or bolt head. This further reduces the risk of electric creep currents.

The recess 261 may be positioned such that it overlaps with a line 262 interconnecting ends of the third and fourth circumferential wall segments 183, 184. In this way, the area that is kept clear of the socket 60 by virtue of the projection is used, at least in part, for allowing the recess 261 to overlap therewith.

Figure 16:
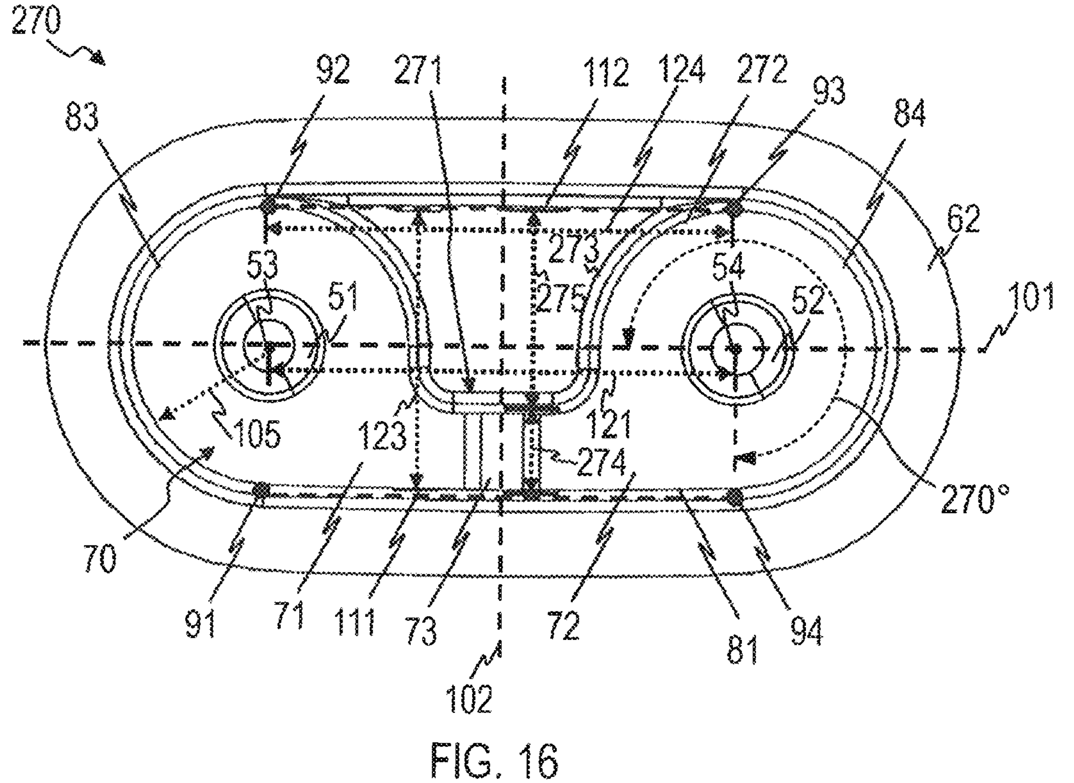
FIG. 16 is a plan view of a socket of a personal care appliance having a second projection geometry.
Figure 17:
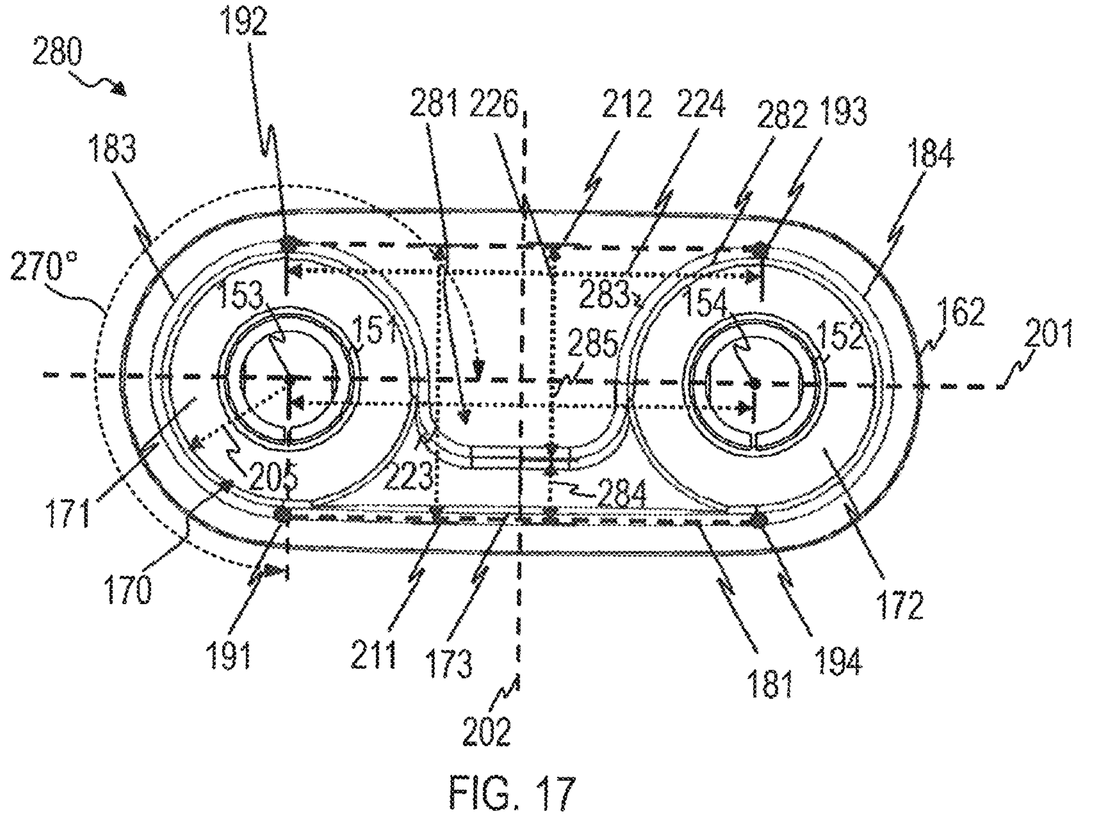
FIG. 17 is a plan view of a plug of a power supply device having a second connector notch geometry.
Figure 18:
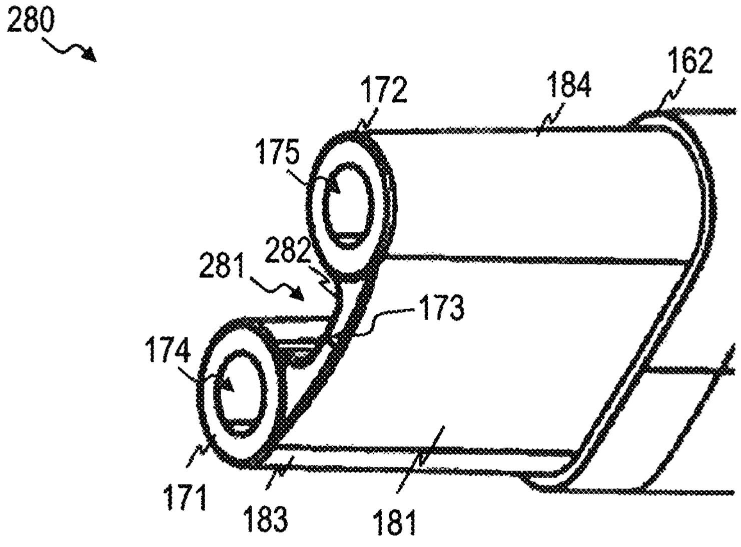
FIG. 18 is a perspective view of a connector of the plug of FIG. 17.
Figure 19:
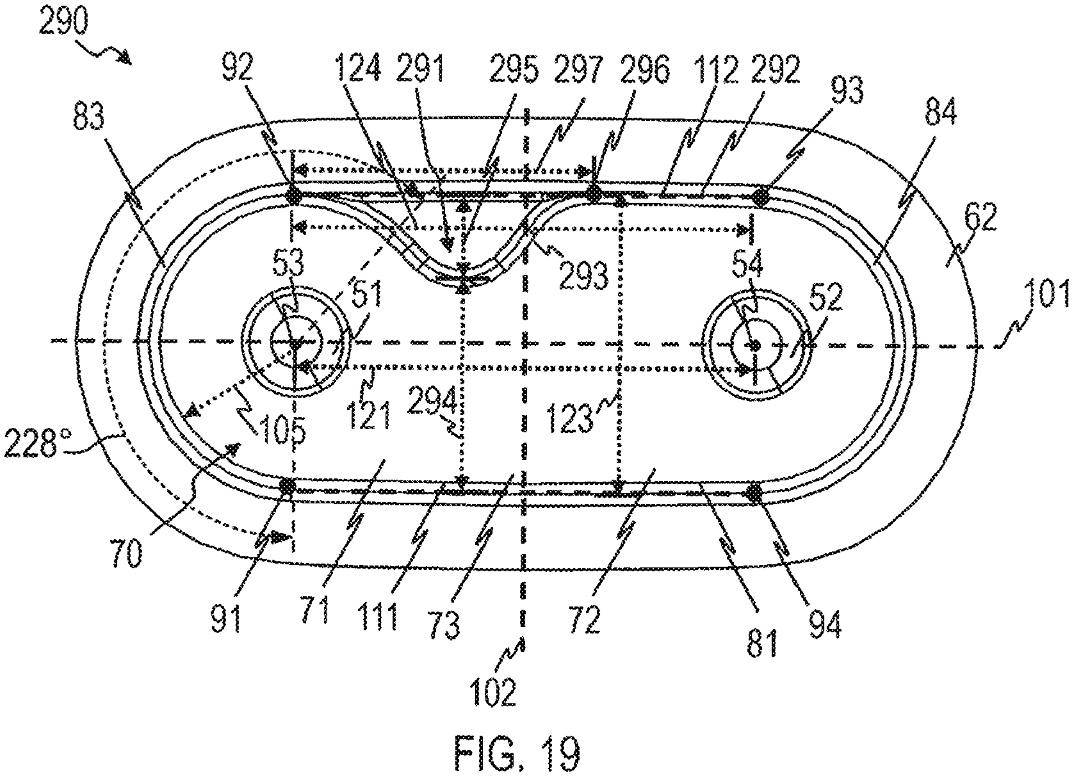
FIG. 19 is a plan view of a socket of a personal care appliance having a third projection geometry.
Figure 20:
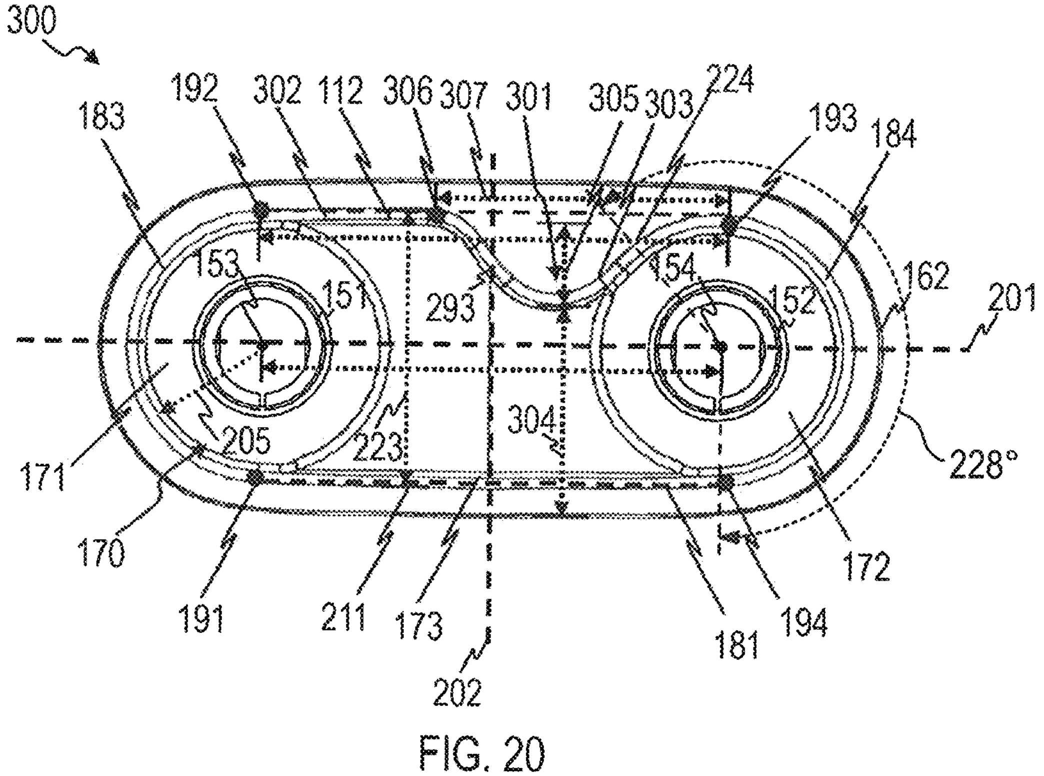
FIG. 20 is a plan view of a plug of a power supply device having a second connector notch geometry.
Figure 21:
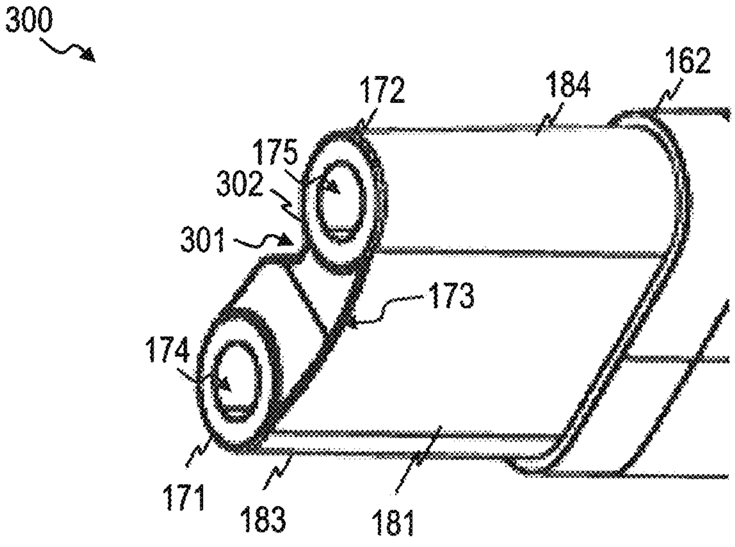
FIG. 21 is a perspective view of a connector of the plug of FIG. 20.

Other projection (female connector) and notch (male connector) geometries may be used. Examples for projection and notch geometries are shown in and explained with reference to FIGS. 16 to 18 for one further projection or notch geometry and FIGS. 19 to 21 for yet another further projection or notch geometry. FIGS. 16 and 19 show female connectors in plan view. FIGS. 17 and 20 show corresponding male connectors in plan view. FIGS. 18 and 21 are partial perspective views of the corresponding male connectors. The various projections and notches are distinguished from each other inter alia in their projection/notch height and projection/notch width. These parameters may be determined as explained with reference to FIGS. 1 to 15.

FIGS. 16 to 18 show connectors in which the projection (female connector) or notch (male connector) is more pronounced than in the connectors of FIGS. 4 to 12.

FIG. 16 is a plan view of a further female connector 270 that may be provided on an appliance. The further female connector 270 has a second circumferential wall segment 272 that is different from the second circumferential wall segment 182 of FIGS. 4 and 5. The second circumferential wall segment 272 comprises a projection segment 273 that forms a projection 271 that has a greater projection height 275 than the female connector 50 of FIGS. 4 and 5. Accordingly, the reduced socket height 274 at the projection 271 is smaller than for the female connector 50 of FIGS. 4 and 5. A projection width 124 may remain the same as compared to the female connector 50 of FIGS. 4 and 5 or may be smaller than for the female connector 50 of FIGS. 4 and 5.

A ratio of the projection width 124 to the socket width 122 may be at least 0.60 or at least 0.61. When the socket has such a configuration, the projection width 124 is comparatively large. The constriction formed in the bottom wall by such a wide projection may further reduce the risk of electrolysis by reducing the risk of electric creepage.

A ratio of the projection height 275 to the radius of curvature 105 of the third and fourth circumferential wall segments 83, 84 may be at least 0.50, at least 0.55, at least 0.60, at least at least 0.70, at least 0.75, at least 0.80, at least 0.85, at least 0.90, at least 0.95, at least 1.00, at least 1.05, or at least 1.10. Alternatively, or additionally, a ratio of the projection height 275 to the socket height 123 may be at least 0.15, at least 0.20, at least 0.25, at least 0.30, at least 0.35, at least 0.4, at least 0.45, at least 0.50, or at least 0.55. This large projection height 275 facilitates configurations in which a screw or bolt head can be positioned separately from and adjacent to the socket, which further decreases the risk of electric creepage and electrolysis.

FIGS. 17 and 18 show a further male connector 280 of a power plug operative for insertion into, inter alia (but not necessarily limited to) the further female connector 270. The further male connector 280 has a second circumferential connector wall segment 282 that is different from the second circumferential connector wall segment 182 of FIGS. 6 to 12. The second circumferential connector wall segment 282 comprises a notch segment 283 that forms a plug connector notch 281 that has a greater plug connector notch height 285 than the male connector 150 of FIGS. 6 to 12. Accordingly, the reduced plug connector height 284 at the plug connector notch 281 is smaller than for the male connector 150 of FIGS. 6 to 12. A notch width 224 may remain the same as compared to the male connector 150 of FIGS. 6 to 12 or may be smaller than for the male connector 150 of FIGS. 6 to 12.

A ratio of the plug connector notch width 224 to the plug connector width 222 may be at least 0.60 or at least 0.61. Alternatively, or additionally, a ratio of the notch width 224 to the sleeve distance 221 may be at least 0.50, at least 0.55, at least 0.60, at least 0.65, at least 0.70, at least 0.75, at least 0.80, at least 0.85, at least 0.90, or at least 0.95.

A ratio of the notch height 285 to the radius of curvature 205 of the third and fourth circumferential connector wall segments 183, 184 may be at least 0.50, at least 0.55, at least at least 0.65, at least 0.70, at least 0.75, at least 0.80, at least 0.85, at least 0.90, at least 0.95, at least 1.00, at least 1.05, or at least 1.10. Alternatively, or additionally, a ratio of the notch height 285 to the plug height 223 may be at least 0.15, at least 0.20, at least 0.25, at least at least 0.35, at least 0.4, at least 0.45, at least 0.50, or at least 0.55. This large notch height 285 facilitates configurations in which a screw or bolt head can be positioned separately from and adjacent to the socket, which further decreases the risk of electric creepage and electrolysis.

FIGS. 19 to 21 show connectors in which the projection (male connector) or notch (female connector) is less pronounced than in the connectors of FIGS. 4 to 12.

FIG. 19 is a plan view of a further female connector 290 that may be provided on an appliance. The further female connector 290 has a second circumferential wall segment 292 that is different from the second circumferential wall segment 182 of FIGS. 4 and 5. The second circumferential wall segment 292 comprises a projection segment 293 that forms a projection 291 that has a smaller projection height 295 than the female connector 50 of FIGS. 4 and 5. Accordingly, the reduced socket height 294 at the projection 291 is greater than for the female connector 50 of FIGS. 4 and 5. A projection width 297 may be smaller than for the female connector 50 of FIGS. 4 and 5 or may remain the same as for the female connector 50 of FIGS. 4 and 5. The projection width 297 is determined as distance between ends 296, 93 of the curved projection segment (e.g., in the third plane 103).

A ratio of the projection width 297 to the socket width 122 may be at least 0.30, at least or at least 0.40.

A ratio of the projection height 295 to the radius of curvature 105 of the third and fourth circumferential wall segments 83, 84 may be at least 0.30, at least 0.35, or at least 0.40. Alternatively, or additionally, a ratio of the projection height 295 to the socket height 123 may be at least 0.15, at least 0.20, at least 0.25, or at least 0.30.

FIGS. 20 and 21 show a further male connector 300 of a power plug operative for insertion into, inter alia (but not necessarily limited to) the further female connector 290.

The further male connector 300 has a second circumferential connector wall segment 302 that is different from the second circumferential connector wall segment 182 of FIGS. 6 to 12. The second circumferential connector wall segment 302 comprises a notch segment 303 that forms a plug connector notch 301 that has a smaller plug connector notch height 305 than the male connector 150 of FIGS. 6 to 12. Accordingly, the reduced plug connector height 304 at the plug connector notch 301 is greater than for the male connector 150 of FIGS. 6 to 12. A plug connector notch width 307 may be smaller than for the male connector 150 of FIGS. 6 to 12 or may remain the same as compared to the male connector 150 of FIGS. 6 to 12. The plug connector notch width 307 is determined as distance between ends 306, 193 of the curved notch segment (e.g., in the third plane 203).

A ratio of the plug connector notch width 307 to the plug connector width 222 may be at least 0.30, at least 0.35, or at least 0.40. Alternatively, or additionally, a ratio of the notch width 307 to the sleeve distance 221 may be at least 0.15, at least 0.20, at least 0.25, or at least A ratio of the notch height 305 to the radius of curvature 205 of the third and fourth circumferential connector wall segments 183, 184 may be at least 0.30, at least 0.35, or at least 0.40. Alternatively, or additionally, a ratio of the notch height 305 to the plug height 223 may be at least 0.15, at least 0.20, at least 0.25, or at least 0.30.

Different types of socket geometries and different types of plug connector geometries may be implemented, as explained above. The various types of geometries may be distinguished from each other by a size and/or position of a projection (female connector) and/or notch (male connector). For illustration, the various types of geometries may be distinguished from each other by their projection/notch width and/or projection/notch height, as explained above. The notch width and notch height of the power plug and the projection width and projection height of the socket may respectively be determined using any one of the techniques described above.

The different notch geometries (e.g., different notch widths and/or notch heights) may be assigned to different characteristics, such as different IPCs. The different projection geometries (e.g., different projection widths and/or projection heights) may be assigned to different characteristics, such as different IPCs. For illustration, kits may include devices in which:

a socket has a socket geometry selected from group that has a socket projection geometry selected from a group comprising a first and second socket projection geometry (and that may consist of the first and second socket projection geometries, an optional third socket projection geometry, and optional additional socket projection geometries); and a power supply device comprises a power plug that has a plug connector notch geometry selected from a group comprising a first and second plug connector notch geometry (and that may consist of the first and second plug connector notch geometries, an optional third plug connector notch geometry, and optional additional plug connector notch geometries).

The different notch geometries may be distinguished from each other in at least one of notch width and notch height. The different projection geometries may be distinguished from each other in at least one of projection width and projection height. The different notch and projection geometries may be such that at least one of the socket projection geometries allows insertion of plug connectors with at least two types of different plug connector notch geometries. The different notch and projection geometries may be such that at least one of the plug connector notch geometries allows the plug connector to be inserted into sockets with at least two types of different socket projection geometries. The different notch and projection geometries may be such that the projection geometries selectively prevent insertion of a power plug depending on characteristics associated with the power plug connector notch geometry, e.g., if the power plug connector notch geometry is assigned to an IPC (determined in accordance with, e.g., IEC 60529, ISO 20653, or DIN 40050-9) that is not compatible with that of the appliance (e.g., because the power supply device has an IPC that is lower than that of the appliance).

The notch and/or projection geometries may be implemented in such a way that:

- the male connector of FIGS. 17 and 18 is insertable into the appliance socket of FIGS. 4 and 5, the appliance socket of FIG. 16, and the appliance socket of FIG. 19;
- the male connector of FIGS. 6 to 12 is insertable into the appliance socket of FIGS. 4 and 5 and is also insertable into the appliance socket of FIG. 16 but is blocked from being inserted into the appliance socket of FIG. 19;
- the male connector of FIGS. 20 and 21 is insertable into the appliance socket of FIG. 19 but is blocked from being inserted into the appliance socket of FIGS. 4 and 5 and from being inserted into the appliance socket of FIG. 16.

The notch and/or projection geometries may be implemented in such a way that:

- the female connector of FIG. 19 can receive the power plug connector of FIGS. 6 to 12, the power plug connector of FIGS. 17 and 18, and the power plug connector of FIGS. 20 and 21;
- the female connector of FIGS. 4 and 5 can receive the power plug connector of FIGS. 6 to 12 and the power plug connector of FIGS. 17 and 18 but blocks insertion of the power plug connector of FIGS. 20 and 21;
- the female connector of FIG. 16 can receive the power plug connector of FIGS. 17 and 18 but blocks insertion of the power plug connector of FIGS. 6 to 12 and of the power plug connector of FIGS. 20 and 21.

The various connector geometries may be assigned to different IPCs and/or different other characteristics, ensuring that a power supply device that is compatible with a more challenging characteristic (e.g., a higher IPC) may also be used on appliances that are designed to comply with less challenging requirements only (e.g., a lower IPC).

For illustration rather than limitation, a connector geometry as explained with reference to FIGS. 19 to 21 may be used for IPX0 plugs and appliances. A connector geometry as explained with reference to FIGS. 4 to 12 may be used for IPX4 plugs and appliances. A connector geometry as explained with reference to FIGS. 16 to 18 may be used for IPX7 plugs and appliances.

Figure 22:
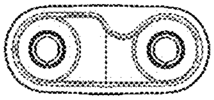
FIG. 22 is a table showing various socket geometries and various plug geometries that are combinable in a kit.
Figure 22:
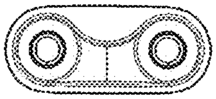
Figure 22:
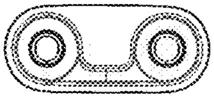
Figure 22:
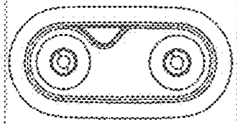
Figure 22:
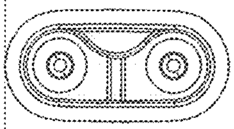
Figure 22:
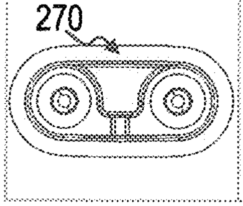

FIG. 22 is a table which illustrates the use of a set of socket geometries and a set of corresponding plug connector geometries which are implemented in such a way that:

- a plug designed to comply with more challenging requirements (e.g., a higher IPC) may be used not only on appliances meeting these challenging requirements (such as the same high IPC as the plug) but also with appliances meeting less challenging requirements (such as a lower IPC than the plug);
- a plug is prevented from being inserted into a socket of an appliance which is designed to meet more challenging requirements (e.g., a higher IPC) than the plug (e.g., when the plug is designed for a lower IPC than the appliance).

Figure 23:
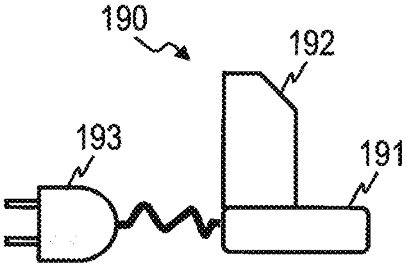
FIG. 23 shows a power supply device according to an embodiment.

A power supply device according to embodiments may comprise a power plug according to an embodiment. The power supply device may be implemented as a power cord, as shown in FIG. 1. FIG. 23 shows another power supply device 190. The power supply device comprises a plug 193 for engagement with a mains outlet, a support 191, and a stand 192 for receiving the appliance thereon. The stand 192 may comprise or may be a power plug as discussed herein. The support 191 may support the stand 192 in a generally upright position when the appliance is received thereon.

The power supply device may be operative to provide a supply voltage, e.g., a voltage in the range between 2 and 18 V; in the range between 4 and 12 V, or of 5V or 12V. The power supply device may comprise a converter for performing a voltage down conversion from a mains voltage of, e.g., 230 V or 110 V, to a supply voltage, e.g., a voltage in the range between 2 and 18 V; in the range between 4 and 12 V, or of 5V or 12V.

Figure 24:
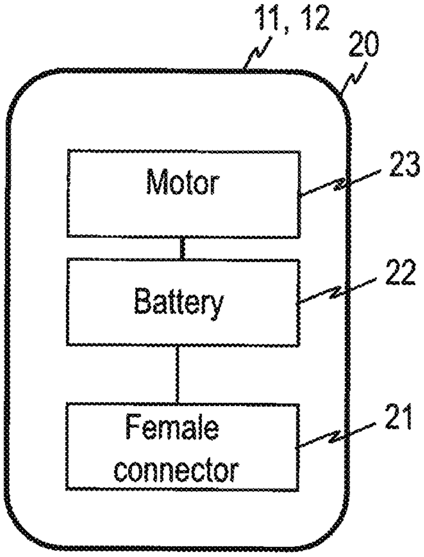
FIG. 24 is a block diagram of a personal care appliance according to an embodiment.

FIG. 24 is a schematic block diagram of an appliance 11, 12. The appliance comprises a female connector 21 that may have any one of the configurations disclosed herein. The female connector may be operative to receive a supply voltage, e.g., a voltage in the range between 2 and 18 V; in the range between 4 and 12 V, or of 5V or 12V.

The appliance 11, 12 may further comprise a battery 22 operative to be charged in response to the supply voltage.

The appliance 11, 12 may further comprise an electromechanical actuator, such as a motor 23, having an output operative to move in response to the supply voltage.

A housing 20 of the appliance 11, 12 may provide a desired IP, which may be reflected by a socket geometry (e.g., a projection geometry) of the female connector 21.

In the various embodiments disclosed herein, the dimensions of the various quantities discussed herein may be as follows. It will be appreciated that not all of the dimensions specified below need to be present in combination.

Female Connector

The pin distance 121 may be 5 mm or more, 6 mm or more, 7 mm or more, or 8 mm or more. The pin distance 121 may be 12 mm or less, 11 mm or less, 10 mm or less, or 9 mm or less. The pin distance 121 may be selected from one of the following ranges: 5 mm to 12 mm, 6 mm to 11 mm, 7 mm to 10 mm, or 8 mm to 9 mm.

The socket width 122 may be 10 mm or more, 11 mm or more, or 12 mm or more. The socket width 122 may be 15 mm or less, 14 mm or less, or 13.5 mm or less. The socket width 122 may be selected from one of the following ranges: 10 mm to 15 mm, 11 mm to 14 mm, or 12 mm to 13.5 mm.

The socket height 123 may be 4.0 mm or more, 4.3 mm or more, or 4.5 mm or more. The socket height 123 may be 5.5 mm or less, 5.2 mm or less, or 5.0 mm or less. The socket height 123 may be selected from one of the following ranges: 4.0 mm to 5.5 mm, 4.3 mm to mm, or 4.5 mm to 5.0 mm.

The radius of curvature 105 may be 1.8 mm or more, 2.0 mm or more, or 2.2 mm or more. The radius of curvature 105 may be 2.8 mm or less, 2.6 mm or less, or 2.4 mm or less. The radius of curvature 105 may be selected from one of the following ranges: 1.8 mm to 2.8 mm, or 2.0 mm to 2.6 mm, or 2.2 mm to 2.4 mm.

The projection width 124 and projection height 126 may be dependent on the IP class of the appliance, as explained above.

Male Connector

The sleeve distance 221 may be 5 mm or more, 6 mm or more, 7 mm or more, or 8 mm or more. The pin distance 221 may be 12 mm or less, 11 mm or less, 10 mm or less, or 9 mm or less. The sleeve distance 221 may be selected from one of the following ranges: 5 mm to 12 mm, 6 mm to 11 mm, 7 mm to 10 mm, or 8 mm to 9 mm.

The plug connector width 222 may be 10 mm or more, 11 mm or more, or 12 mm or more. The plug connector width 222 may be 15 mm or less, 14 mm or less, or 13.5 mm or less. The plug connector width 222 may be selected from one of the following ranges: 10 mm to 15 mm, 11 mm to 14 mm, or 12 mm to 13.5 mm.

The plug connector height 223 may be 4.0 mm or more, 4.3 mm or more, or 4.5 mm or more. The plug connector height 223 may be 5.5 mm or less, 5.2 mm or less, or 5.0 mm or less. The plug connector height 223 may be selected from one of the following ranges: 4.0 mm to mm, 4.3 mm to 5.2 mm, or 4.5 mm to 5.0 mm.

The radius of curvature 205 may be 1.8 mm or more, 2.0 mm or more, or 2.2 mm or more. The radius of curvature 205 may be 2.8 mm or less, 2.6 mm or less, or 2.4 mm or less. The radius of curvature 205 may be selected from one of the following ranges: 1.8 mm to 2.8 mm, or 2.0 mm to 2.6 mm, or 2.2 mm to 2.4 mm.

An outer diameter 228 of the first and second connector sleeves 151, 152 may be 2.0 mm or more, 2.2 mm or more, or 2.4 mm or more. The outer diameter 128 of the first and second connector sleeves 151, 152 may be 3.2 mm or less, 3.0 mm or less, or 2.8 mm or less. The outer diameter 228 of the first and second connector sleeves 151, 152 may be selected from one of the following ranges: 2.0 mm to 3.2 mm, 2.2 mm to 3.0 mm, or 2.4 mm to 2.8 mm.

The notch width 224 and notch height 226 may be dependent on the IP class of the power supply device and/or of the appliance for which the male connector is designed, as explained above.

Various effects are attained by the devices, systems, kits, and methods disclosed herein. Improved protection against electrolysis can be attained, facilitating usage in conditions in which remnant fluid may be prone to adhering to connectors. A platform for combining male and female connectors in a versatile manner can be implemented, while providing protection against undesired reverse polarity engagement of male and female connectors.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A kit, comprising:

a first personal care appliance selected from an electric tooth-brush, a shaver, a charging device, a cleaning station, or an epilator, the first personal care appliance comprising a first housing having a first socket having exactly two connector sleeves, wherein the first socket has a first socket geometry assigned to a first ingress protection class (IPC); and a first power supply device comprising a first power plug having exactly two connector pins, wherein the first power plug has a first plug geometry assigned to a second IPC equal to or different from the first IPC, wherein the first socket geometry is selected from a set of at least two IPC-differentiated socket geometries, each IPC-differentiated socket geometry of the set providing a corresponding socket IPC, wherein the first plug geometry is selected from a corresponding set of at least two IPC-differentiated plug geometries, each IPC-differentiated plug geometry of the corresponding set providing a corresponding plug IPC, wherein the first socket geometry comprises a shape that is operative to:

allow power plugs having one of the IPC-differentiated plug geometries with a corresponding plug IPC equal to the first IPC to be inserted into the first socket, allow power plugs having one of the IPC-differentiated plug geometries with a corresponding plug IPC higher than the first IPC to be inserted into the first socket, and prevent power plugs having one of the IPC-differentiated plug geometries with a corresponding plug IPC lower than the first IPC from being inserted into the first socket.

2. The kit of claim 1, wherein:

the kit further comprises a second power supply device comprising a second power plug, the second power plug having a second plug geometry selected from the set of at least two IPC-differentiated plug geometries and having a second corresponding plug IPC higher than the first IPC; and the first socket is shaped to allow insertion of the first power plug into the first socket and to allow insertion of the second power plug into the first socket.

3. The kit of claim 2, wherein:

the kit further comprises a second personal care appliance comprising a second housing having a second socket, the second socket having a second socket geometry selected from the corresponding set of at least two IPC-differentiated socket geometries and having a second socket IPC different from the second IPC; and the second socket is shaped to prevent insertion of the first power plug into the second socket and to allow insertion of the second power plug into the second socket.

4. The kit of claim 1, wherein the first socket comprises a first connector pin and a second connector pin, wherein at least a part of the first connector pin and at least a part of the second connector pin extends within the first socket, wherein:

the first connector pin has a first center axis, the second connector pin has a second center axis, the first center axis and the second center axis are spaced by a pin distance, the first center axis and the second center axis define a first plane, and a second plane is perpendicular to the first plane and extends parallel to and is equally spaced from the first center axis and the second center axis;

wherein the first socket is provided with a first socket circumferential wall and a first socket bottom wall, wherein the first socket circumferential wall comprises;

a first circumferential wall segment;

a second circumferential wall segment;

a third circumferential wall segment that is curved, intersects the first plane, and interconnects the first circumferential wall segment and the second circumferential wall segment;

a fourth circumferential wall segment that is curved, intersects the first plane, and interconnects the first circumferential wall segment and the second circumferential wall segment;

wherein the first and second circumferential wall segments are arranged on opposite sides of the first plane and the third and fourth circumferential wall segments are arranged on opposite sides of the second plane; and wherein the second circumferential wall segment comprises a projection segment that forms a projection; and wherein the first socket bottom wall comprises:

a first bottom wall segment extending transverse to the first and second planes, wherein the first connector pin projects from the first bottom wall segment;

a second bottom wall segment extending transverse to the first and second planes, wherein the second connector pin projects from the second bottom wall segment;

wherein a third plane is perpendicular to the first plane and the second plane and wherein the first bottom wall segment and the second bottom wall segment extend in the third plane, and wherein the third circumferential wall segment has a radius of curvature.

5. The kit of claim 4, wherein a ratio of the radius of curvature to the pin distance is less than or equal to about 0.35.

6. The kit of claim 4, wherein an intersection of the third circumferential wall segment with the third plane comprises a first circular arc around the first center axis extending over a first angle of greater than or equal to about 170°, and wherein an intersection of the fourth circumferential wall segment with the third plane comprises a second circular arc around the second center axis extending over a second angle of greater than or equal to about 170°.

7. The kit of claim 4, wherein the first socket bottom wall further comprises a rib extending between the first bottom wall segment and the second bottom wall segment and projecting relative to the first bottom wall segment and the second bottom wall segment to separate the first bottom wall segment and the second bottom wall segment, wherein the rib extends continuously from the first circumferential wall segment to the second circumferential wall segment, and wherein the rib has an apex line that lies within the second plane.

8. The kit of claim 4, wherein the first circumferential wall segment has a shape different from a shape of the second circumferential wall segment.

9. The kit of claim 4, wherein the personal care appliance further comprises a screw head or bolt head that is exposed on a surface of the housing, the housing comprises a recess in which the screw or bolt head is arranged, and the recess is separated from the first socket.

10. The kit of claim 1, wherein the power plug comprises:

a first connector sleeve;

a second connector sleeve;

wherein:

the first connector sleeve has a first sleeve center axis, the second connector sleeve has a second sleeve center axis, the first sleeve center axis and the second sleeve center axis are spaced by a sleeve distance, the first sleeve center axis and the second sleeve center axis define a first connector plane, a second connector plane is perpendicular to the first connector plane and extends parallel to and is equally spaced from the first sleeve center axis and the second sleeve center axis, and wherein the power plug further comprises:

an end surface in which a first pin insertion opening, and a second pin insertion opening are arranged;

a circumferential connector wall that extends from a circumference of the end surface;

wherein the circumferential connector wall comprises:

a first circumferential connector wall segment;

a second circumferential connector wall segment;

a third circumferential connector wall segment that is curved, intersects the first connector plane, and interconnects the first circumferential connector wall segment and the second circumferential connector wall segment;

a fourth circumferential connector wall segment that is curved, intersects the first connector plane, and interconnects the first circumferential connector wall segment and the second circumferential connector wall segment;

wherein the first and second circumferential connector wall segments are arranged on opposite sides of the first connector plane and the third and fourth circumferential connector wall segments are arranged on opposite sides of the second connector plane; and wherein the second circumferential connector wall segment comprises a connector notch segment that forms a connector notch; and wherein the end surface comprises:

a first end surface segment extending transverse to the first and second connector planes, wherein the first end surface segment comprises the first connector pin insertion opening; and a second end surface segment extending transverse to the first and second connector planes, wherein the second end surface segment comprises the second connector pin insertion opening;

wherein:

a third connector plane is perpendicular to the first connector plane and the second connector plane and wherein the first end surface segment and the second end surface segment extend in the third connector plane; and the third circumferential connector wall segment has a radius of curvature.

11. The kit of claim 10, wherein a ratio of the radius of curvature to the sleeve distance is less than or equal to about 0.35.

12. The kit of claim 10, wherein the third circumferential connector wall segments comprises a first circular arc around the first center axis extending over a first angle of greater than or equal to about 170°, and wherein the fourth circumferential connector wall segments comprise a second circular arc around the second center axis extending over a second angle of greater than or equal to about 170°.

13. The kit of claim 10, wherein the end surface comprises a groove arranged between the first end surface segment and the second end surface segment, and wherein the groove extends continuously between the first circumferential connector wall segment and the second circumferential connector wall segment.

14. The kit of claim 10, wherein a first plastic component that comprises the circumferential connector wall and the end surface is formed from a first plastic material, and wherein the power plug further comprises a second plastic component connected to an end of the first plastic component that is opposite the end surface, the second plastic component being formed from a second plastic material, the first plastic material having a first hardness and the second plastic material having a second hardness different from the first hardness, and wherein the second plastic material forms a bend protection portion.

15. The kit of claim 10, wherein the first connector sleeve is a first slotted sleeve operative to snap over a second connector pin of a male connector and/or wherein the second connector sleeve is a second slotted sleeve operative to snap over a first connector pin of the male connector.

16. A kit, comprising:

a first personal care appliance selected from an electric toothbrush, a shaver, a charging device, a cleaning station, or an epilator, the first personal care appliance comprising a first housing having a first socket, the first socket having a first socket geometry;

a second personal care appliance comprising a second housing having a second socket, the second socket having a second socket geometry, said second housing being more watertight than said first housing;

a first power supply device comprising a first power housing and a first power plug, the first power plug having a first plug geometry;

a second power supply device comprising a second power housing and a second power plug, the second power plug having a second plug geometry, said second power housing being more watertight than said first power housing;

wherein said first plug geometry is configured so that said first power plug fits within said first socket but not within said second socket and wherein said second plug geometry is configured so that said second power plug fits within both said first socket and within said second socket.

17. The kit of claim 16, wherein a first connecting surface of said first plug geometry provided for connecting with said first socket is larger than a second connecting surface of said second plug geometry provided for connecting with said second socket.

18. The kit of claim 16, wherein said first plug geometry comprises a first lateral notch and wherein said second plug geometry comprises a second lateral notch and wherein the second lateral notch is deeper than the first lateral notch.

19. The kit of claim 16, further comprising:

a third personal care appliance comprising a third housing having a third socket, the third socket having a third socket geometry, said second housing and said first housing being more watertight than said third housing;

a third power supply device comprising a third power housing and a third power plug, the third power plug having a third plug geometry, said second power housing and said first power housing being more watertight than said first power housing, wherein said first plug geometry and said second plug geometry are configured so that both said first power plug and said second power plug fit within said third socket; and wherein said third plug geometry is configured so that the third power plug does not fit within the first socket or the second socket.

20. The kit of claim 16, wherein said first and second power supply devices comprise a converter for performing a voltage down conversion from a mains voltage to a supply voltage.

* * * * *